(12) United States Patent
Zehner et al.

(10) Patent No.: US 6,753,999 B2
(45) Date of Patent: Jun. 22, 2004

(54) ELECTROPHORETIC DISPLAYS IN PORTABLE DEVICES AND SYSTEMS FOR ADDRESSING SUCH DISPLAYS

(75) Inventors: Robert W. Zehner, Cambridge, MA (US); Gregg M. Duthaler, Needham, MA (US); Richard J. Paolini, Jr., Arlington, MA (US); Ian Morrison, Acton, MA (US)

(73) Assignee: E Ink Corporation, Cambridge, MA (US)

( * ) Notice: Subject to any disclaimer, the term of this patent is extended or adjusted under 35 U.S.C. 154(b) by 162 days.

(21) Appl. No.: 10/160,131

(22) Filed: May 31, 2002

(65) Prior Publication Data

US 2003/0011868 A1 Jan. 16, 2003

Related U.S. Application Data

(63) Continuation-in-part of application No. 09/272,716, filed on Mar. 18, 1999, now Pat. No. 6,445,489, said application No. 10/160,131, is a continuation-in-part of application No. 09/464,264, filed on Dec. 17, 1999.

(60) Provisional application No. 60/078,363, filed on Mar. 18, 1998, provisional application No. 60/090,232, filed on Jun. 22, 1998, provisional application No. 60/112,882, filed on Dec. 18, 1998, and provisional application No. 60/119,393, filed on Feb. 10, 1999.

(51) Int. Cl.[7] ............ G02B 26/00; G09G 3/34; G03G 17/04; G01N 27/26
(52) U.S. Cl. ............ 359/296; 345/107; 430/35; 204/450; 204/606
(58) Field of Search ............ 359/296; 345/105, 345/107, 108; 430/35; 204/450, 600, 606

(56) References Cited

U.S. PATENT DOCUMENTS

| | | | |
|---|---|---|---|
| 3,036,388 A | 5/1962 | Tate | |
| 3,384,488 A | 5/1968 | Tulagin et al. | |
| 3,406,363 A | 10/1968 | Tate | |
| 3,460,248 A | 8/1969 | Tate | |
| 3,585,381 A | 6/1971 | Hodson et al. | |
| 3,612,758 A | 10/1971 | Evans et al. | |
| 3,617,374 A | 11/1971 | Hodson et al. | |
| 3,756,693 A | 9/1973 | Ota | |
| 3,767,392 A | * 10/1973 | Ota | .............. 430/35 |

(List continued on next page.)

FOREIGN PATENT DOCUMENTS

| | | |
|---|---|---|
| DE | 24 42 257 A1 * | 3/1975 |
| EP | 0 186 710 A1 | 6/1984 |
| EP | 0 390 303 A2 | 10/1990 |

(List continued on next page.)

OTHER PUBLICATIONS

Dalisa, A.L.; Electrophoretic Displays; Jan. 1, 1980; 215–232; Display Devices.

Duthhaler et al.; Active–Matrix Color Displays Using Electrophoretic Ink and Color Filters; Jan. 1, 2002; 1374–1377; SID 02 Dig st.

Fitzhenry, B.; Identification of a Charging Mechanism using Infrared Spectroscopy; Jan. 1, 1979; 107–110; Applied Spectroscopy; 33(2).

(List continued on next page.)

Primary Examiner—Loha Ben
(74) Attorney, Agent, or Firm—Testa, Hurwitz & Thibeault, LLP

(57) ABSTRACT

A card may include a photoconductive layer and an electrophoretic layer. The impedance of the photoconductive layer is lowered when struck by light from the light-emitting layer. Where the impedance of the photoconductive layer is lowered, the electrophoretic layer may be addressed by an applied electric field to update an image on the card. The image on a card may be updated by a system of updating an image on a card and a method of updating an image on a card that are presented.

41 Claims, 13 Drawing Sheets

U.S. PATENT DOCUMENTS

| | | | |
|---|---|---|---|
| 3,870,517 A | 3/1975 | Ota et al. | |
| 3,959,906 A | 6/1976 | Norris, Jr. et al. | |
| 4,062,009 A | 12/1977 | Raverdy et al. | |
| 4,071,430 A | 1/1978 | Liebert | |
| 4,126,854 A | 11/1978 | Sheridon | |
| 4,143,472 A | 3/1979 | Murata et al. | |
| 4,196,437 A | 4/1980 | Hertz | |
| 4,251,747 A | 2/1981 | Burdick | |
| 4,272,596 A | 6/1981 | Harbour et al. | |
| 4,314,013 A | 2/1982 | Chang | |
| 4,368,952 A | 1/1983 | Murata et al. | |
| 4,438,160 A | 3/1984 | Ishikawa et al. | |
| 4,450,440 A | 5/1984 | White | |
| 4,544,834 A | 10/1985 | Newport et al. | |
| 4,606,611 A | 8/1986 | Fergason | |
| 4,707,593 A | 11/1987 | Murata et al. | |
| 4,870,677 A | 9/1989 | Di Santo et al. | |
| 4,931,019 A | 6/1990 | Park | |
| 5,151,032 A | 9/1992 | Igawa | |
| 5,160,371 A | 11/1992 | Ito | |
| 5,161,007 A | 11/1992 | Takanashi et al. | |
| 5,179,065 A | 1/1993 | Ito | |
| 5,179,517 A | 1/1993 | Sarbin et al. | |
| 5,185,226 A | 2/1993 | Grosso et al. | |
| 5,208,686 A | 5/1993 | Fergason | |
| 5,262,098 A | 11/1993 | Crowley et al. | |
| 5,276,438 A | 1/1994 | DiSanto et al. | |
| 5,344,594 A | 9/1994 | Sheridon | |
| 5,345,322 A | 9/1994 | Fergason | |
| 5,360,689 A | 11/1994 | Hou et al. | |
| 5,398,131 A | 3/1995 | Hall et al. | |
| 5,450,069 A | 9/1995 | DiSanto et al. | |
| 5,459,776 A | 10/1995 | Di Santo et al. | |
| 5,498,674 A | 3/1996 | Hou et al. | |
| 5,508,068 A | 4/1996 | Nakano | |
| 5,543,219 A | 8/1996 | Elwakil | |
| 5,575,554 A | 11/1996 | Guritz | |
| 5,600,172 A | 2/1997 | McDevitt et al. | |
| 5,609,978 A | 3/1997 | Giorgianni et al. | |
| 5,635,317 A | 6/1997 | Taniguchi et al. | |
| 5,648,801 A | 7/1997 | Beardsley et al. | |
| 5,650,247 A | 7/1997 | Taniguchi et al. | |
| 5,686,383 A | 11/1997 | Long et al. | |
| 5,718,996 A | 2/1998 | Iijima et al. | |
| 5,737,115 A | 4/1998 | Mackinlay et al. | |
| 5,738,716 A | 4/1998 | Santilli et al. | |
| 5,751,268 A | 5/1998 | Sheridon | |
| 5,751,433 A | 5/1998 | Narendranath et al. | |
| 5,751,434 A | 5/1998 | Narendranath et al. | |
| 5,760,761 A | 6/1998 | Sheridon | |
| 5,767,826 A | 6/1998 | Sheridon et al. | |
| 5,767,978 A | 6/1998 | Revankar et al. | |
| 5,786,875 A | 7/1998 | Brader et al. | |
| 5,958,169 A | 9/1999 | Titterington et al. | |
| 5,963,456 A | 10/1999 | Klein et al. | |
| 5,986,622 A | 11/1999 | Ong | |
| 6,017,584 A | 1/2000 | Albert et al. | |
| 6,045,955 A | 4/2000 | Vincent | |
| 6,113,810 A | 9/2000 | Hou et al. | |
| 6,118,426 A | 9/2000 | Albert et al. | |
| 6,137,467 A | 10/2000 | Sheridon et al. | |
| 6,144,361 A | 11/2000 | Gordon, II et al. | |
| 6,153,075 A | 11/2000 | Nemelka | |
| 6,177,921 B1 | 1/2001 | Comiskey et al. | |
| 6,184,856 B1 | 2/2001 | Gordon, II et al. | |
| 6,215,920 B1 | 4/2001 | Whitehead et al. | |
| 6,219,160 B1 | 4/2001 | Nordal et al. | |
| 6,225,971 B1 | 5/2001 | Gordon, II et al. | |
| 6,232,950 B1 | 5/2001 | Albert et al. | |
| 6,239,896 B1 | 5/2001 | Ikeda | |
| 6,252,564 B1 | 6/2001 | Albert et al. | |
| 6,271,823 B1 | 8/2001 | Gordon, II et al. | |
| 6,445,374 B2 | 9/2002 | Albert et al. | |
| 6,459,418 B1 | 10/2002 | Comiskey et al. | |

FOREIGN PATENT DOCUMENTS

| | | |
|---|---|---|
| EP | 0 417 362 A1 | 3/1991 |
| EP | 0 443 571 A2 | 8/1991 |
| EP | 0 540 281 A2 | 5/1993 |
| EP | 0 709 713 A2 | 5/1996 |
| EP | 0 962 808 A2 | 12/1999 |
| GB | 2 094 044 A | 9/1982 |
| GB | 2 149 548 A | 6/1985 |
| GB | 2 255 934 A | 11/1992 |
| JP | 60189731 | 9/1985 |
| JP | 62269124 | 5/1986 |
| JP | 62058222 | 3/1987 |
| JP | 62231930 | 10/1987 |
| JP | 62299824 | 12/1987 |
| JP | 01177517 | 7/1989 |
| JP | 01267525 | 10/1989 |
| JP | 3091722 | 4/1991 |
| JP | 03091722 A | 4/1991 |
| JP | 03096925 A | 4/1991 |
| JP | 3096925 | 4/1991 |
| JP | 4307523 | 10/1992 |
| JP | 04345133 A | 12/1992 |
| JP | 59098227 | 6/1994 |
| JP | 9-185097 | 7/1997 |
| JP | 10142628 | 5/1998 |
| JP | 10-161161 | 6/1998 |
| JP | 11202804 | 7/1999 |
| JP | 11212499 | 8/1999 |
| JP | 11219135 | 8/1999 |
| JP | 11352526 | 12/1999 |
| JP | 00066248 | 3/2000 |
| JP | 00089260 | 3/2000 |
| JP | 00137250 | 5/2000 |
| JP | 00171839 | 6/2000 |
| JP | 00194020 | 7/2000 |
| JP | 00194021 | 7/2000 |
| JP | 00206574 | 7/2000 |
| JP | 00227612 | 8/2000 |
| JP | 00258805 | 9/2000 |
| JP | 00259102 | 9/2000 |
| JP | 00322003 | 11/2000 |
| JP | 00322004 | 11/2000 |
| JP | 00322005 | 11/2000 |
| JP | 00322007 | 11/2000 |
| JP | 00352946 | 12/2000 |
| JP | 01033831 | 2/2001 |
| JP | 01056653 | 2/2001 |
| JP | 06239896 | 5/2001 |
| WO | WO 93/05425 | 3/1993 |
| WO | WO 96/13469 | 5/1996 |
| WO | WO 97/01166 | 1/1997 |
| WO | WO 99/05236 | 2/1999 |
| WO | WO 99/05237 | 2/1999 |
| WO | WO 99/05645 | 2/1999 |
| WO | WO 99/05646 | 2/1999 |
| WO | WO 99/10768 | 3/1999 |
| WO | WO 99/10769 | 3/1999 |
| WO | WO 99/41788 | 8/1999 |
| WO | WO 99/53373 | 10/1999 |
| WO | WO 00/03291 | 1/2000 |
| WO | WO 00/36560 | 6/2000 |
| WO | WO 00/49593 | 8/2000 |
| WO | WO 01/65309 A2 | 9/2001 |

OTHER PUBLICATIONS

Fitzhenry–Ritz, B.; Optical Properties of Electrophorectic Image Displays; Jan. 1, 1981; 300–09; Proceedings of the SID; 22(4).

Lee, L. L.; A Magnetic–Particles Display; Jul. 1, 1975; 177–184; Proceeding of the S.I.D,; 16(3).

Lewis J.C.; Electrophoretic Displays; 223–240; Nonemissive Electrooptic Displays (Plenum Press).

Pankove, J. I.; Color Reflection Type Display Panel; Mar. 1, 1962; sheets; RCA Technical Notes; 535.

Shimoda et al.; 26.3: Multicolor Pixel Patterning of Light–Emitting Polymers by Ink–Jet Printing; May 18, 1999; 376–79; Society for Information Display International Symposium Digest of Technical Papers; 30.

* cited by examiner

ELECTROPHORETIC DISPLAYS IN PORTABLE DEVICES AND SYSTEMS FOR ADDRESSING SUCH DISPLAYS

CROSS-REFERENCE TO RELATED APPLICATIONS

The present application is a continuation in part of U.S. Ser. No. 09/272,716, which was filed on Mar. 18, 1999, now U.S. Pat. No. 6,445,489 which itself claims the benefit of U.S.S. No. 60/078,363, filed Mar. 18, 1998 and U.S.S. No. 60/090,232, filed Jun. 22, 1998, the disclosures of which are hereby incorporated by reference.

The present application is also a continuation in part of U.S. Ser. No. 09/464,264, which was filed on Dec. 17, 1999, which claims priority to and the benefit of U.S. provisional patent applications serial No. 60/112,882, filed Dec. 18, 1998, and serial No. 60/119,393, filed Feb. 10, 1999. The entire disclosures of these applications are hereby incorporated by reference.

FIELD OF THE INVENTION

The present invention relates to electrophoretic displays, especially encapsulated electrophoretic displays, and to systems for addressing such displays.

BACKGROUND OF THE INVENTION

There are a number of interesting display media which provide good optical appearance, the ability to be easily constructed in large areas or on flexible substrates at low cost. Such display media include microencapsulated electrophoretic displays, rotating bichromal ball displays, suspended particle displays, and composites of liquid crystals with polymers, including polymer dispersed liquid crystals, polymer stabilized liquid crystals, and liquid crystal gels.

One drawback of such displays is that they are difficult to practically and economically address. One common means of addressing is known as direct drive addressing, in which each pixel is controlled by its own external drive circuit. This scheme is both expensive and impractical for displays containing a large number of pixels and for displays containing pixels that are tightly packed.

Another means of addressing is active matrix drive addressing, in which an electrically non-linear element is deposited on the display substrate. Examples of such electronically non-linear elements include transistors, diodes, and varistors. While this type of addressing is well-known and widely practiced, it is expensive to produce and difficult to achieve on plastic substrates.

A third means of addressing uses multiplexing, in which the conductive portions of the substrate are patterned so that rows of pixels on the substrate are electrically connected and columns of pixels on the substrate are also electrically connected. Typically, voltages are sequentially placed on the row electrodes, with the pixel data for each row being placed on the column electrode. This type of addressing is used for a variety of display media. Its use is limited, however, to displays in which the optical response as a function of applied voltage is non-linear and in which there is a significant voltage threshold to turn on the pixels. Display media which do not show a pronounced voltage threshold show poor contrast when driven with multiplex addressing drive schemes.

This invention provides electrophoretic displays, especially encapsulated electrophoretic displays, and systems for addressing display media of such displays. Systems of the invention allow for the addressing of display media that have poor threshold behavior without the high costs associated with using direct drive and active matrix drive addressing schemes. This is accomplished by using a multiplex addressing drive scheme in conjunction with a light system that generates a pattern of light.

There are numerous applications that can benefit from such a new addressing means. For instance, with the advent of information storing members (such as RAM and magnetic strips) in wallet-size card, it has become desirable to create 'smart cards' capable of displaying on the card the updated information contained in the card. Typical cards such as credit cards have a magnetic strip on the rear surface, and a subset of the information contained on the magnetic strip, such as the cardholder name and card number, is embossed physically onto the front surface of the card. This usually suffices for this purpose, since the information on the strip is static. For transaction type cards, such as debit cards, however, there is a need for a means to display the information, which is stored on the card, as it is constantly changing. For example, phone cards and access cards may have certain value units which are purchased from some central or distributed authority. These value units (such as tokens, in the case of a subway, or phone minutes) may be actually stored locally on the card and interrogated offline, or the card may carry simply an identification number which is verified at each transaction and correlated with a central balance. The balance remaining on the card, however, is usually not indicated to the user. Prior art solutions to this problem involve systems such as that employed in the Washington D.C. subway, where a computer daisywheel printer prints the current balance on the card paper surface directly below the prior balance. There are several problems with this solution. First, the user can no longer simply swipe the card through a reader, but must insert it into a large machine in which the printer is housed. Second, cards made with this paper surface are not very durable, the information is not erased but basically crossed out; as a result, the card may be used only so many times before the balance space is filled up. Accordingly, such cards can benefit from the inclusion of a dynamic medium for updating the information contained thereon. Other examples of portable devices that can benefit from a novel system of updating the display on a card include access cards, smart cards, payment cards, price tags, and lottery tickets.

SUMMARY OF THE INVENTION

The present invention provides electrophoretic displays, especially encapsulated electrophoretic displays, and systems for addressing such displays. Displays of the invention include a photoconductive layer and an electrophoretic layer. Such displays may be rigid or flexible. Displays of the invention may also include a light image generated from a light source, a photoconductive layer, and an electrophoretic layer.

In one embodiment of the invention, a portable display card and system of updating the image on the card of the invention includes a light system that generates a light pattern, a card that includes a photoconductive layer and an electrophoretic layer. The photoconductive layer is adjacent the electrophoretic layer and the pattern of light reduces impedance in the photoconductive layer. The reduced impedance permits an applied electric field to address the electrophoretic layer. In some embodiments, the display cards also have one or more optical barrier layers.

The display cards have a front side and a rear side. When the rear side of the card is exposed to a pattern of light from the light source, light strikes the photoconductive layer and the photoconductive layer impedance decreases. The decreased impedance enables electrodes to apply a voltage, which addresses the electrophoretic layer, forming an updated image on the display card. In some embodiments, an electrode on the rear side of the card is clear. Light from the light source travels through the clear electrode to strike the photoconductive layer.

In another embodiment, the invention relates to an electrophoretic display including a light system, a photoconductive layer placed adjacent the organic, light-emitting layer, and an electrophoretic layer adjacent the photoconductive layer. Light from the organic, light-emitting layer strikes the photoconductive layer at a first point on a first side of the photoconductive layer, which faces the organic, light-emitting layer. A voltage is then generated at a second point on a second side of the photoconductive layer. This second point corresponds to the first point and faces the electrophoretic layer. The voltage at the second point addresses the electrophoretic layer at a predetermined point on the electrophoretic layer.

When the display is not illuminated, the impedance of the photoconductive layer is much greater than the impedance of the electrophoretic layer. The photoconductive layer therefore drops the majority of the applied voltage. When the photoconductive display is illuminated, the impedance of the photoconductive layer decreases, and the majority of the applied voltage then drops across the electrophoretic layer, forming an image. Specifically, the photoconductive layer is biased at a voltage on the "rear" side, which faces the light source. The portions of the photoconductive layer that are exposed to light effectively transfer the voltage to the "front" side of the photoconductive layer, which faces the electrophoretic layer.

The present invention provides a display integrated into a smart card which is capable of being externally addressed. The display may be bistable, reflective, and preferably capable of being printed or laminated directly onto the card. It may be addressed directly by an electrostatic head.

In one embodiment, the invention incorporates features of a standard smart card. The embodiment may comprise a photoconductive layer, an electrophoretic layer, and an activation device all disposed in a substrate. In some embodiments, the activation device comprises a smart card interface and/or an electrophoretic layer interface. The smart card interface provides information to or triggers the encapsulated electrophoretic display to display a message. The smart card interface can be an information storage device, and the display can show information stored in the information storage device. The information storage device can have information associated with a subway access card, or financial information for a telephone card, a debit card, a credit card, or the like.

In another embodiment, an electrostatic head is embedded directly into the magnetic strip reader/writer. In this embodiment, the card's magnetic strip is read in a single swipe and the display electrostatically addressed. In one embodiment, a laminate is constructed which consists of a rear conductive substrate (i.e., a photoconductive layer or a photoconductive layer and a first electrode), a layer of bistable electrostatically addressable ink material (i.e. an electrophoretic layer), and a protective top dielectric layer (i.e., a transparent layer). This structure is then laminated to a typical magnetic strip card, such as a subway access card. In one embodiment, the magnetic strip is laminated to the rear of the card. A section of a first electrode may be left exposed. When swiped in a specially designed reader, the magnetic strip reader can read the data on the card, write new data onto the strip, and on the opposite side of the card, an electrostatic head can write data onto the display material, making a single electrical connection to the first electrode and erasing and addressing the display material with positive and negative potentials relative to the first electrode. This hardware device which integrates a magnetic reader, writer, and electrostatic addressing head is also a novel construction. In some embodiments, the hardware device comprises a light source capable of updating the display by reducing impedance and providing an electric current, addressing the card. The magnetic reader can be used to sense the velocity of the swipe, and control the speed of the addressing. In one embodiment, magnetic strip and an electrophoretic layer interface are present on a card, the information read from and written to the magnetic strip preferably may not be visually displayed. Alternatively, the display may be integrated onto a standard smart card, which is then capable of being addressed externally when inserted into a reader.

In another aspect, the invention features a light system for addressing a smart card. The light system may comprise a light source incorporated in a standard smart card reader. The light system may comprise a light source, an activation device reader, an activation device writer, a display addressing head, a smart card connector and an electrophoretic connector. The electrophoretic display can be externally addressable. For example, the electrophoretic display may be addressable with an electrostatic head. In another embodiment, the electrophoretic display may be addressed by inserting the card into the light system that includes a standard smart card reader.

In another embodiment, the invention provides a method of updating an image on a card, for example, a smart card. The method comprises the steps of providing a card comprising an electrophoretic layer and a photoconductive layer. The photoconductive layer provides impedance and is adjacent the electrophoretic layer. The photoconducutive layer is exposed to a pattern of light. The light pattern decreases the impedance of the photoconductive layer and an electric field is applied, addressing the electrophoretic layer. In some embodiments, the pattern of light and resulting display on a smart card is responsive to display information present in the smart card interface. Methods of the invention can optionally include the steps of obtaining an output from an activation device of a smart card; and addressing an encapsulated electrophoretic display of the smart card to display information responsive to the output from the activation device. The invention may also further include a method of manufacturing a smart card. In one embodiment, the method comprises the steps of providing a photoconductive layer; disposing a magnetic strip on a surface of the photoconductive layer; and disposing an encapsulated electrophoretic display on a surface of the photoconductive layer.

Displays of the invention may also include a reflective substrate to direct light from the light system to the photoconductive layer. Displays of the invention may also include a dielectrophoretic layer, which is preferably fenestrated. Finally, displays of the invention may also include a capacitor.

In another embodiment of the invention, an emissive display includes an organic, light-emitting layer and a photoconductive layer disposed under the organic, light-emitting layer. In this embodiment, the organic, light-emitting layer is addressable at a first predetermined voltage. A first fraction of this first predetermined voltage drops across the organic, light-emitting layer, and a second fraction of this first predetermined voltage drops across the photoconductive layer. When the organic, light-emitting layer is addressed using this first predetermined voltage, it emits light, which strikes the photoconductive layer. This light causes the impedance of the photoconductive layer to decrease, so that the fraction of the first predetermined voltage dropping across the photoconductive layer is decreased and the fraction of the first predetermined voltage dropping across the organic, light-emitting layer is increased. The organic, light-emitting layer may then be addressed at a second predetermined voltage, which is lower than the first predetermined voltage. In an alternative embodiment, the emissive display includes a fenestrated dielectrophoretic layer, which modulates the amount of light striking the photoconductive layer.

The organic, light-emitting layer for use in displays of the invention includes an organic material disposed on a clear substrate. The clear substrate may be a glass, a plastic, or a polyester substrate, for example. The organic, light-emitting material may be an organic compound, an organometallic compound, an oligomer, or a polymer. Dispersed within the organic material may be inorganic semiconductors, such as CdSe conductors, for example.

The photoconductive layer for use in displays of the invention includes a photoconductive material, such as 2,4,7-trinitro-9-fluorenone complexed with poly(N-vinylcarbazole). The photoconductive material may be an organic photoconductive polymer, a dye-aggregate photoreceptor, or a pigment-based photoreceptor. In one embodiment, the photoconductive layer is disposed on a clear substrate, such as a glass, a plastic, or a polyester substrate, for example. In one embodiment, an optical barrier layer is disposed over or adjacent to the photoconductive layer. The optical barrier layer is a dispersion of opaque conductive particles in a polymer matrix, such as a dispersion of black pigment particles in an epoxy binder, for example. In other embodiments, the photoconductive layer includes a first photoconductive material and a second photoconductive material. The second photoconductive material is sensitive to a different variable of light than the first photoconductive material. The variable of light may be the wavelength of the light, the intensity of the light, or the duration of the light.

The electrophoretic layer for use in displays of the invention may be an encapsulated electrophoretic layer or a dielectrophoretic layer. An encapsulated electrophoretic layer of the invention includes a plurality of particles dispersed in a suspending fluid, which is encapsulated in a polymer matrix. The polymer matrix may include an aqueous polymer latex, such as a polyurethane, for example. The polymer matrix may be coated onto a substrate, such as a glass, plastic, or polyester substrate, for example.

In another embodiment of the invention, a display includes a clear top electrode. This clear top electrode may comprise a conductive material on a substrate. The clear top electrode may be indium tin oxide (ITO) coated onto a glass, plastic, or polyester substrate, for example.

The invention will be understood further upon consideration of the following drawings, description, and claims.

BRIEF DESCRIPTION OF THE DRAWINGS

Like reference characters in the drawings represent corresponding parts.

DETAILED DESCRIPTION OF THE INVENTION

The invention relates to electrophoretic displays, especially encapsulated electrophoretic displays, and to systems for addressing such displays. Generally, an electrophoretic display of the invention includes a light system, a photoconductive layer, and an electrophoretic layer. The light system may be a light-emitting layer. The light system may also be, for example, a phosphor emission screen, a micro-mirror display, a transmissive liquid crystal display (which could be in the form of a polymer-dispersed liquid crystal), an emissive display made of a light-emitting material, such as an organic compound, an organometallic compound, an oligomer, or a polymer, or another emissive display known to one skilled in the art. The photoconductive layer may be inorganic, for example an inorganic conductive polymer, but is preferably an organic conductive polymer, a dye-aggregate photoreceptor, or a pigment-based photoreceptor. The light emitting layer and the photoconductive layer are both preferably disposed on a clear substrate, such as a glass, plastic, or polyester substrate, for example. The electrophoretic layer may be an encapsulated electrophoretic layer or a dielectrophoretic layer, for example. Displays of the invention may also include a dielectrophoretic layer, which is preferably fenestrated. Displays of the invention may be either rigid or flexible. Finally, displays of the invention may include at least one capacitor.

Displays of the invention provide for the use of a multiplexed drive scheme to address the display. In the below-described embodiments of the invention, the light-emitting layer is addressed using a multiplex addressing drive scheme. The impedance of the photoconductive layer is lowered when it is struck by light from the light-emitting layer. As a result of the lowered impedance of the photoconductive layer, the electrophoretic layer, which itself cannot be multiplexed, is addressed at a lower, subthreshold voltage in dark regions of the display and at a higher voltage in the illuminated regions of the display.

The present invention provides novel combinations of emissive materials and electrophoretic display materials to provide the effective multiplexed addressing of the electrophoretic display. In particular, organic, light-emitting materials, which have not been previously described in optical addressing of electrophoretic displays, are described as the multiplexed emissive materials. Additionally, the use of emissive materials in this manner extends the number of organic emissives that are practical for a number of applications. Finally, applications of these materials on flexible substrates, which are useful in larger-area, low cost, or high-durability applications, is also described. Electrophoretic displays of the invention are described below.

Figure 1:
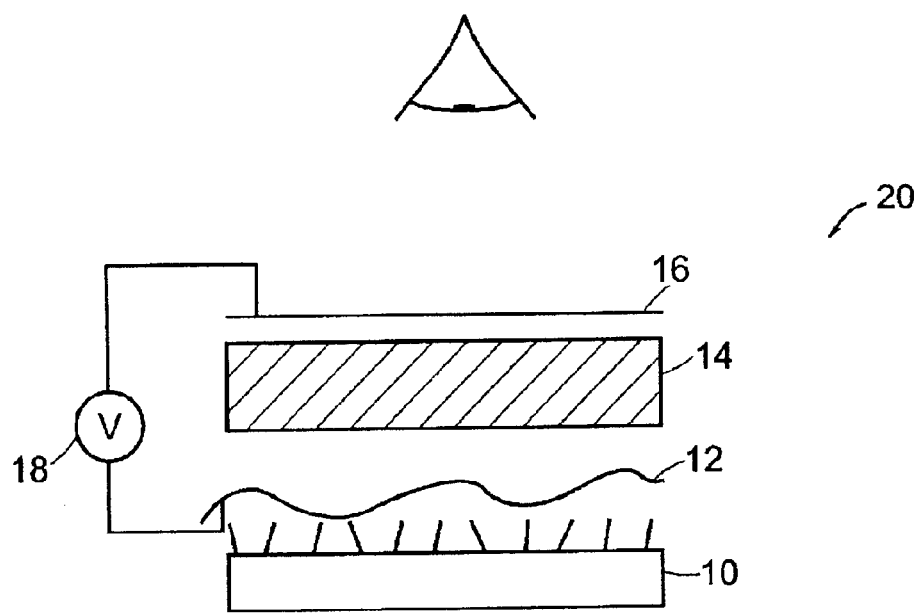
FIG. 1 shows an embodiment of a display in accordance with the present invention.

FIG. 1 shows a display of the invention. The display 20 includes light-emitting layer 10, photoconductive layer 12, electrophoretic layer 14, clear top electrode 16, and a source of voltage 18. In one embodiment, the clear top electrode 16 is a glass, plastic, or polyester substrate coated with indium tin oxide (ITO). In the embodiment shown in FIG. 1, a large voltage is placed on the photoconductive layer 12 relative to the electrophoretic layer 14, so that the photoconductive layer 12 essentially serves as one electrode of the display 20. When no light strikes the photoconductive layer 12, the voltage drops primarily across the photoconductive layer 12 (i.e., no voltage on the electrophoretic layer 14). When light strikes the photoconductive layer 12, however, voltage drops across the electrophoretic layer 14, and the electrophoretic layer 14 is addressed.

Electrophoretic layers for use in displays of the invention are preferably encapsulated electrophoretic layers, but other electrophoretic layers are contemplated by the invention. Such layers include dielectrophoretic layers, addressable retroreflective layers, and micro-mechanical, micro-mirror, or other light-directing layers, as well as layers in which the optical effect is achieved by translating various liquids of differing dielectric constants (i.e., suspended liquid displays). The electrophoretic layer may also be a classic emissive, transmissive, or transflective display material. Furthermore, the electrophoretic layer may be nematic liquid crystals in a variety of modes (e.g., tunable birefringence, twisted nematic, or vertically-aligned nematic), polymer dispersed liquid crystals, ferroelectric liquid crystals, or standard electrophoretic displays on glass. (See, e.g., "High Resolution Display with Photoconductor Addressing" by Stephen Blazo, SID Digest Technical Papers 1982, pp. 92–93). Such displays, while effective, are, however, typically expensive to produce and/or are limited to use in small areas.

An encapsulated electrophoretic layer of the invention preferably contains particles in a suspending fluid. In some embodiments of the invention, at least one species of particles are titania particles or other particles of high refractive index such as clays. In other embodiments of the invention, at least one species of particles responds to heat, fluorescent light, magnetic field, or other phenomena, and releases light.

Referring again to FIG. 1, if the electrophoretic layer 14 has a low conductivity (i.e., the particles are the primary charge carriers), the particles are brought to one electrode by the application of a high voltage, while the photoconductive layer 12 is kept dark. Alternatively, if the electrophoretic layer 14 has a high conductivity (i.e., there are a large number of free ions), the particles are brought to one electrode by the application of a high voltage and the entire display is illuminated. Once the particles are on one side or the other of the display, they will remain in a stable position near the wall of the electrophoretic layer 14 (i.e., the display is bistable). The voltage is then reversed by ramping very slowly to the opposite polarity. If the electrophoretic layer 14 has a low conductivity, this ramping may be done in the dark. If the electrophoretic layer 14 has a high conductivity, this ramping must be done in the dark. With the voltage remaining on, the photoconductive layer 12 is illuminated image-wise. The particles then move to the opposite electrode in the regions of the electrophoretic layer 14 that are adjacent to the illuminated regions of the photoconductive layer 12.

In an alternative embodiment of the display of FIG. 1, the light-emitting layer 10 is addressed using an active matrix addressing scheme. The emission from the light-emitting layer 10 then addresses the electrophoretic layer 14, mediated by the photoconductive layer 12. The advantage here is that the light-emitting layer 10 can be driven at low voltages and with low power, as is compatible with active matrix devices. Some implementations of the displays described herein require high voltages, which are incompatible with active matrix electronics. This embodiment therefore provides a system in which a low voltage active matrix panel drives a high voltage display medium, mediated by the light-emitting layer 10 and the photoconductive layer 12.

Light-emitting layers for use in displays of the invention are preferably an organic, light-emitting material (i.e., an organic, light-emitting diode, or OLED) disposed on a clear substrate. The substrate may be a glass, plastic, or polyester substrate. Organic, light-emitting materials, or OLEDs, for use in displays of the invention include organic compounds, organometallic compounds, oligomers, and polymers. Examples of organic materials that may be useful in the invention include, but are not limited to, tris-(8-hydroxyquinoline) aluminum (Alq3), N,N'-bis-(1-naphyl)-N,N'-diphenyl-1,1'-biphenyl-4,4'-diamine (NPB), poly[2,5-bis[2-(N,N,N-triethylammonium)ethoxy]-1,4-phenylene-alt-1,4-phenylene]dibromide (PPP-NEt3+)5, and poly(5-methoxy-(2-propanoxysulfonide)-1,4-phenylene vinylene) (MPS-PPV). In one embodiment, the organic, light-emitting layer is a multi-layer composition. For example, the organic, light-emitting layer may be a composition of ITO/copper phthalocyanine/NPB/8-hydroxyquinoline aluminum/Mg. Additionally, composites of such organic materials may be used as the organic, light-emitting layer, such as MPS-PPV doped PPP-NEt3+, for example. Other organic, light-emitting materials that may be useful in the invention are not formally diodes. Such materials work by the formation of dynamic p-n junctions or by other processes, such as chemiluminescence, for example. The light-emitting materials described herein include these and related materials.

Organic, light-emitting materials for use in the invention may also include dispersions or layers of inorganic semiconductors. Such inorganic semiconductors include, but are not limited to, CdSe. The devices may have multiple layers, including electron-injecting electrodes, electron transport layers, emissive layers, hole transporting layers, and hole-injecting electrodes.

One drawback of organic, light-emitting materials is their relatively short lifetimes, particularly when operated to produce light. In particular, the organic, light-emitting material tends to degrade unless water and oxygen are excluded. For this reason, the organic light-emitting material may be protected from exposure to water and oxygen by a barrier layer disposed over the organic, light-emitting material.

In addition to organic, light-emitting materials, other light-emitting materials may be useful in the invention. Suitable light-emitting materials include, but are not limited to, transmissive materials, lasers, slide projectors, inorganic, light-emitting diodes, cathode ray tubes, and incandescent, fluorescent, infrared, or neon bulbs. Similarly, the light-emitting layer may be a microwave, radio frequency, or X-ray device, or any other device or material that creates, either directly or through suitable means, sufficient wavelength energy to cause an electrical response by an appropriately sensitive mediator. The light-emitting material may also be an electroluminescent material, such as ZnS dispersed in a polymer matrix, for example.

Photoconductive materials for use in displays of the invention include inorganic materials, organic photoconductive polymers, dye-aggregate photoreceptors, and pigment-based photoconductors. In some embodiments of the invention, it may be advantageous to construct a two-layer photoconductive material in which the charge-generation and charge-transport layers are separate (i.e., a dual-layer configuration). Photoconductive materials for use in displays of the invention are preferably organic photoconductive polymers. An example of an organic photoconductive polymer is 2,4,7-trinitro-9-fluorenone complexed with poly (N-vinylcarbazole). For pigment-based photoconductors, the pigment particles themselves may be photoconductive, so that the photoactive and optically active components are the same.

Other examples of photoconductive materials that may be useful in displays of the invention include inorganic and organic photoconductive materials, layered photoconductive materials having inorganic or organic compositions, and composite layered devices containing photoconductive materials in a polymer matrix. Example of photoconductive materials include, for example, an inorganic photoconductive composition or an organic photoconductive composition dispersed in a resinous binder material such as, for example, a poly(hydroxyether) material. One example of a composite layered device is a dispersion of zinc oxide particles in a polymer matrix. Useful polymer matrices include those that are incapable of transporting for any significant distance injected charge carriers generated by the photoconductive material. Such useful polymer matrices include, but are not limited to, polystrene resins, silicone resins, acrylic and methacrylic ester polymers, polymerized ester derivatives of acrylic and α-acrylic acids, chlorinated rubber, vinyl polymers and copolymers, and cellulose esters. Other known photoconductive materials which may be useful in the present invention include hydrogenated amorphous silicon, microcrystalline silicon, cadmium selenide, gallium arsenide, trigonal selenium, amorphous selenium, doped amorphous selenium substances, halogen doped amorphous selenium substances, amorphous selenium alloys, doped amorphous selenium alloys, including selenium arsenic, selenium tellurium, selenium arsenic antimony, halogen doped selenium alloys, wherein the dopant is a material such as chlorine, iodine, bromine, sodium or fluorine, cadmium sulfide, an alkali metal, and the like. Selenium alloys that may be used may comprise, for example, selenium-tellurium-arsenic, in one embodiment a halogen doped selenium arsenic alloy is empoloyed. Other inorganic photoconductive materials may include, for example, cadmium sulfoselenide, cadmium selenide, and cadmium sulfide. The organic photoconductive composition may include, for example, a metal free phthalocyanine, a metal phthalocyanine, a charge transfer complex material, a squarilium dye, and a vanadyl phthalocyanine. Generally, these photoconductive materials are deposited on a suitable clear substrate, such as a glass, plastic, or polyester substrate.

Depending on their construction, photoconductive materials are tuned in sensitivity to different portions of the infrared, visible, and ultraviolet spectrum. A photoconductive material for use in a display of the invention preferably has an absorption activity that is substantially matched to the emissive wavelength range of the particular organic, light-emitting material being used in that display. The wavelength sensitivity of the photoconductor is dependent on the composition of the charge generator. For example, if the charge generator is primarily selenium alloys, the photoconductive material is most sensitive to blue light near the 400 nm wavelength range. Alternatively, if the charge generator is mainly phthalocyanine pigments, the photoconductive material is most sensitive to red light near the 700 nm wavelength range.

Figure 2:
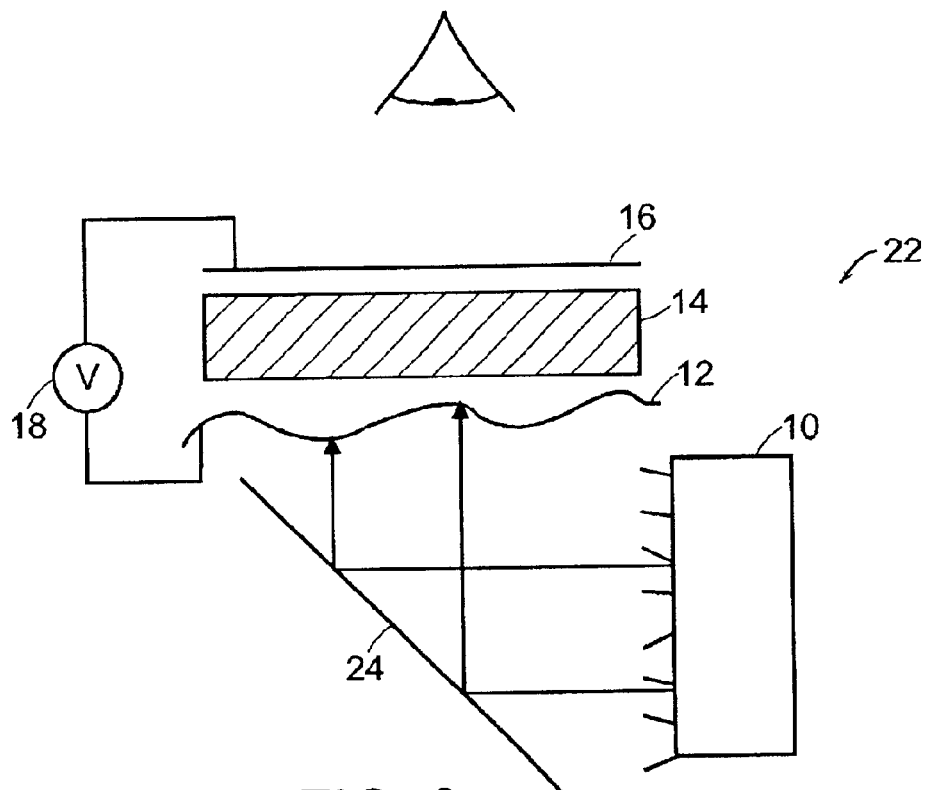
FIG. 2 shows another embodiment of a display in accordance with the present invention containing a reflective substrate for directing light from an emissive layer to a photoconductive layer.

While the invention shown in FIG. 1 generally describes a light-emitting layer 10 directly behind the electrophoretic layer 14 and photoconductive layer 12, the light source can also be in front, to the side, or offset from the electrophoretic layer or photoconductive layer. One such example is shown in FIG. 2. FIG. 2 shows a display 22 having a light-emitting layer 10 offset to the right of, and on a different plane from, the photoconductive layer 12 and the electrophoretic layer 14. Mirror 24 serves to direct light from the light-emitting layer 10 to the photoconductive layer 12. In alternative embodiments, the light is conveyed by light pipe, mirror, fiber optic assembly, or other light-transmitting methods. Similarly, in another alternative embodiment, the electrical properties of the photoconductive layer 12 are conveyed to the electrophoretic layer 14 by various connecting conductors or otherwise conductive layers.

The embodiment of the invention shown in FIG. 1 has many benefits over traditional displays. For example, the light-emitting layer 10 and the electrophoretic layer 14 are opto-isolated, making the display 20 more tolerant of surges and spikes in the drive electronics than would be true if the drive electronics were connected directly. Furthermore, when the display 20 is bistable, the display need only operate during the switching period and is otherwise deactivated. During the switching period, even a small amount of light is sufficient to activate certain photoconductors. Thus, the display operates with reduced power consumption and improved lifetime compared to a standalone emissive display. Finally, in this embodiment of the invention, favorable lower-voltage addressing characteristics of the light-emitting layer 10 are utilized by the electrophoretic layer 14. The display 20 therefore provides for the use of cheaper low-voltage drivers to address a high-voltage display.

Figure 3:
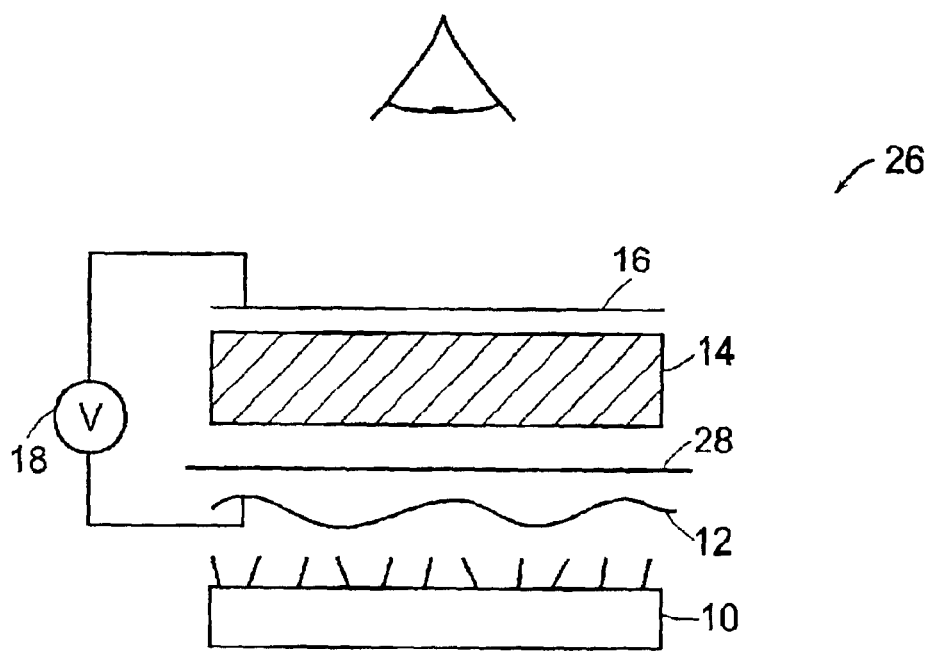
FIG. 3 shows another embodiment of a display in accordance with the present invention, the display containing a light-blocking layer.

FIG. 3 shows another display of the invention. The display 26 includes light-emitting layer 10, photoconductive layer 12, optical barrier layer 28, electrophoretic layer 14, a clear top electrode 16, and a source of voltage 18. Electrophoretic layers are naturally highly light blocking, since they are designed to have a high contrast between the two states. Many photoconductive layers, on the other hand, are highly sensitive to light, so that even a little light leaking through the electrophoretic layer 14 is sufficient to render the photoconductive layer 12 conductive. In this case, an optical barrier layer 28 is inserted between the electrophoretic layer 14 and the photoconductive layer 12. As described above, an optical barrier layer 28 may be a dispersion of black pigment particles in an epoxy binder, for example. This optical barrier layer 28 also conducts a charge from the photoconductive layer 12 to the electrophoretic layer 14. The conductivity of the optical barrier layer 28 must, however, be low enough to prevent most of the lateral charge flow. This is usually accomplished by making the optical blocking layer 28 as thin as possible.

Figure 4:
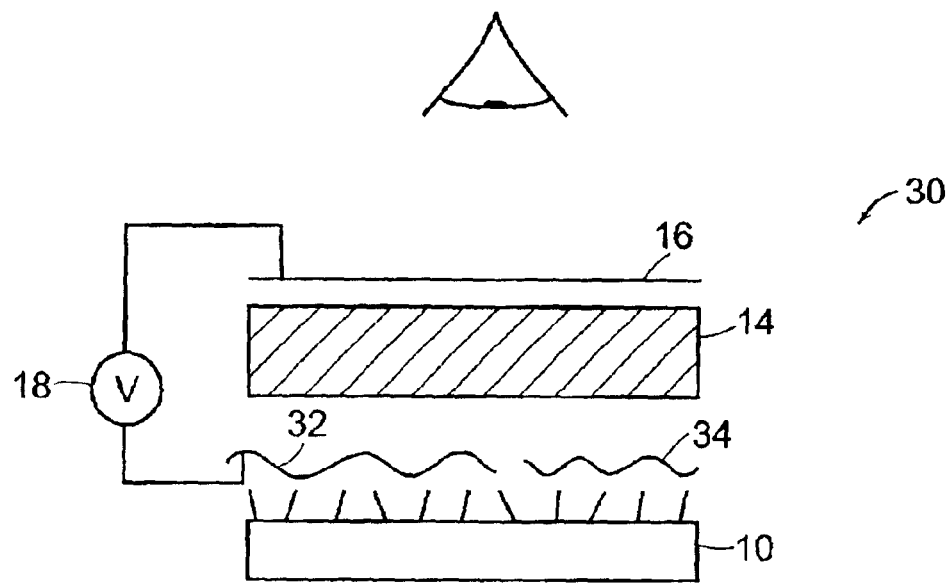
FIG. 4 shows another embodiment of a display in accordance with the present invention, the display containing two different types of photoconductive materials.

In other embodiments of the invention, the photoconductive layer may or may not be optically responsive in a uniform manner across the entire display or a pixel of the display. By creating sub-pixel regions in which the photoconductive layer differs, varying optical effects are achieved. On such example is shown in FIG. 4. FIG. 4 shows a display 30 containing a light-emitting layer 10, a first photoconductive material 32, a second photoconductive material 34, an electrophoretic layer 14, a clear top electrode 16, and a source of voltage 18. Each of the first and second photoconductive materials is sensitive to a different variable of light. The variable may be the wavelength of the light, the intensity of the light, or the duration of the light. By varying, for example, the wavelength of light from the light-emitting layer 10, different sub-pixel regions of the electrophoretic layer 14 are addressed.

The embodiment as shown in FIG. 4 may have a varying number of sub-pixel regions which may provide grayscale by using spatial dithering techniques. For example, a pixel is split into four sub-pixels with each sub-pixel having a photoconductive material sensitive to, for example, varying levels or durations of light. A single underlying light-emitting layer actuates one, two, three, or four of the sub-pixel regions, and thereby achieves grayscale.

Alternatively, photoconductive materials are known whose resistance varies smoothly with light intensity over a considerable range of light intensities. Such photoconductive materials may be used in the present display. In one embodiment photoconductive materials having resistance that varies smoothly over a range of light intensities are used in the present display in combination with an emissive display which is capable of variable light emission, e.g., a grayscale emissive display, to provide grayscale without using spatial dithering techniques. In this manner grayscale emissive display drives a grayscale electrophoretic display, In another embodiment, photoconductor layer sub-regions or sub-pixels are tuned to respond to varying frequencies of light. By addressing a single pixel using a display that is capable of generating multiple frequencies of light, one could actuate any desired number of multiple individual sub-regions or sub-pixels. This permits an emissive display of one resolution to successfully address a second display at a higher resolution.

While the invention disclosed above generally describes an electrophoretic layer that covers a photoconductive layer, that in turn covers a light-emitting layer, the various layers can also be applied with partial coverage to achieve various effects. For example, the pixels of the electrophoretic layer may have sub-pixel regions. In one embodiment shown in FIG. 5, the display 40 contains sub-pixel region 42, which is a bistable electrophoretic material, behind which is a first photoconductive material 44. Behind the photoconductive material 44 is a light-emitting layer 10 that is addressed using a multiplex addressing drive scheme. In another sub-pixel region, a second photoconductive material 46, which is affected by a different wavelength, higher intensity, or duration of light, is open to ambient light from the front. This second photoconductive material 46 may or may not be electrically connected with the sub-pixel region 42. Light from an external source is therefore used to address the entire display. Such a display could, for example, be used for a projection device, which is electronically addressable from behind, as well as addressable by a user standing in front holding a laser pointer or by a projective display.

Figure 5:
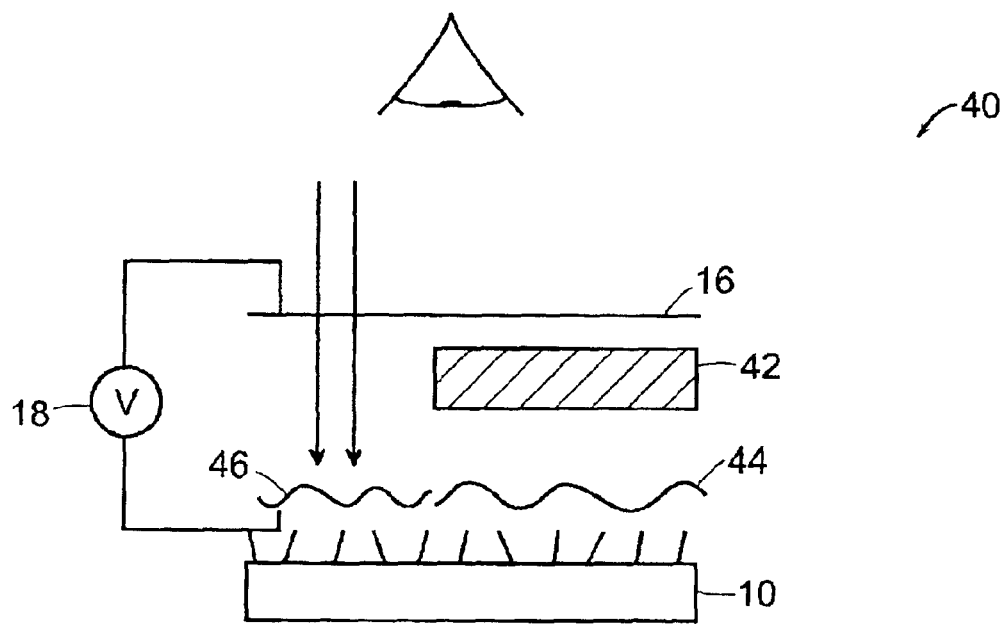
FIG. 5 shows another embodiment of a display in accordance with the present invention, the display containing a partial electrophoretic layer.

In an alternative embodiment of the invention shown in FIG. 5, the light-emitting layer 10 is open at the rear and is addressed via direct drive or active matrix drive addressing schemes, or by electrostatic print head. An electrical change in the light-emitting layer 10 either causes an optical response across the corresponding sub-pixel of the display or, by electrical connection, causes an optical response across the entire pixel. In this manner, a large display such as a wallboard or a billboard is not only matrix addressed at a coarser resolution, but also addressed at higher resolutions by an alternative drive scheme. For example, with a suitably shaped additional electrode layer, the wallboard or the billboard displays a giant logo in detailed resolution and then alternates with a variable message display. Alternatively, an electrostatic print head updates one part of the wallboard or the billboard with extremely high resolution, while the remainder of the display is animated or updated at coarser resolution on a frequent or rotating basis.

Another alternative embodiment includes a sub-pixel containing a photoconductive layer that is optically open from the rear. Again, this photoconductive layer addresses only the sub-pixel immediately above it. If the photoconductive layer is connected by electrical or optical connection to the entire pixel, the entire pixel is addressed. In this manner, a billboard is addressed via matrix addressing, as well as by a laser projector that rasterizes across the rear or by a slide projector that projects onto the display.

Figure 6:
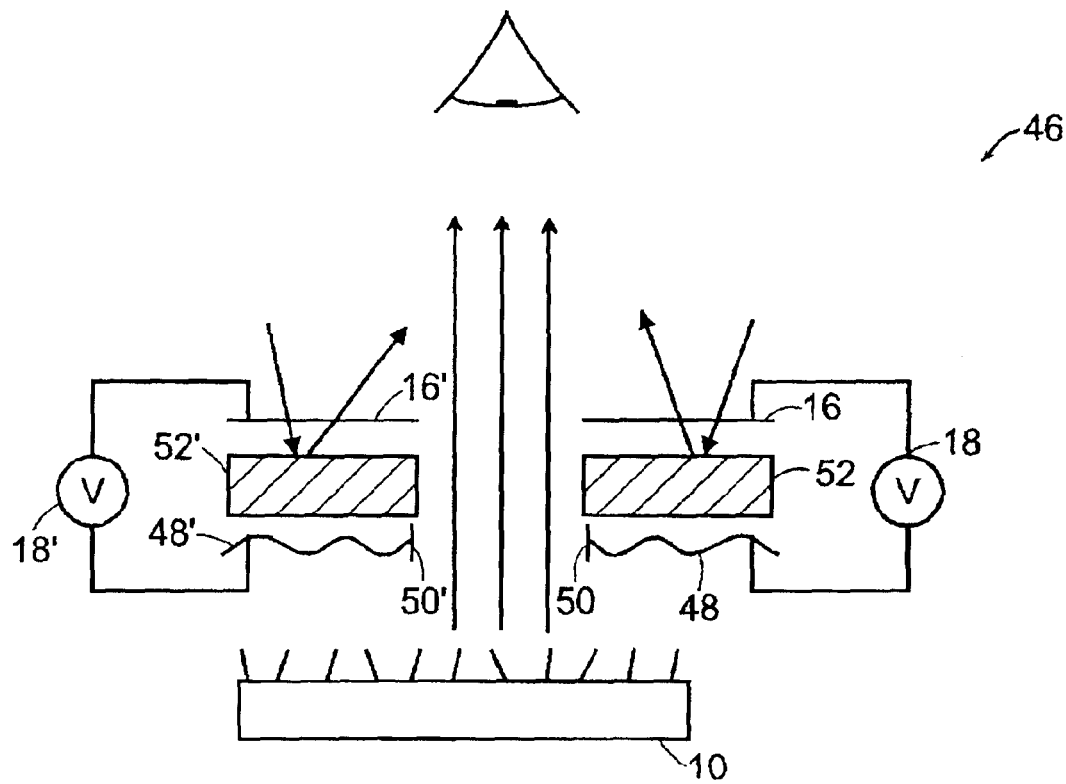
FIG. 6 shows another embodiment of a display in accordance with the present invention, the display containing partial electrophoretic and photoconductive layers, as well as a light-blocking material.

In another embodiment shown in FIG. 6, the display 46 contains a hole or clear region through which light from the emissive portion of the display is visible. The display 46 contains a light-emitting layer 10, photoconductive layers 48 and 48', optical barrier layers 50 and 50', electrophoretic layers 52 and 52', clear top electrodes 16 and 16', and sources of voltage 18 and 18'. In this manner, an outdoor display could be constructed which either emits light through the opening between the electrophoretic layers 52 and 52' or operates in a reflective mode with light being emitted from the electrophoretic layers 52 and 52' as they are addressed. The optical barrier layers 50 and 50' prevent external light from striking the photoconductive layers 48 and 48' and thereby addressing the display 46. Alternatively, the display 46 uses the same addressing method for both types of emission.

In alternative embodiments of the display shown in FIG. 6, a fenestrated layer is used to control the amount of ambient light striking the photoconductive materials. Alternatively, an external laser, stylus or projected light source addresses the display by transmitting straight through the electrophoretic layer at a frequency that activates a photoconductive material that is sensitive to that frequency. By tuning the laser to a certain frequency and by driving the photoconductive layer with voltage in a synchronized manner, the display's exposure to unwanted ambient light at the chosen frequency is reduced. In another alternative embodiment, the addition of an optical filter or a light-modulating layer, such as a photochromic material, affects the amount of light striking the photoconductive layer.

Figure 7:
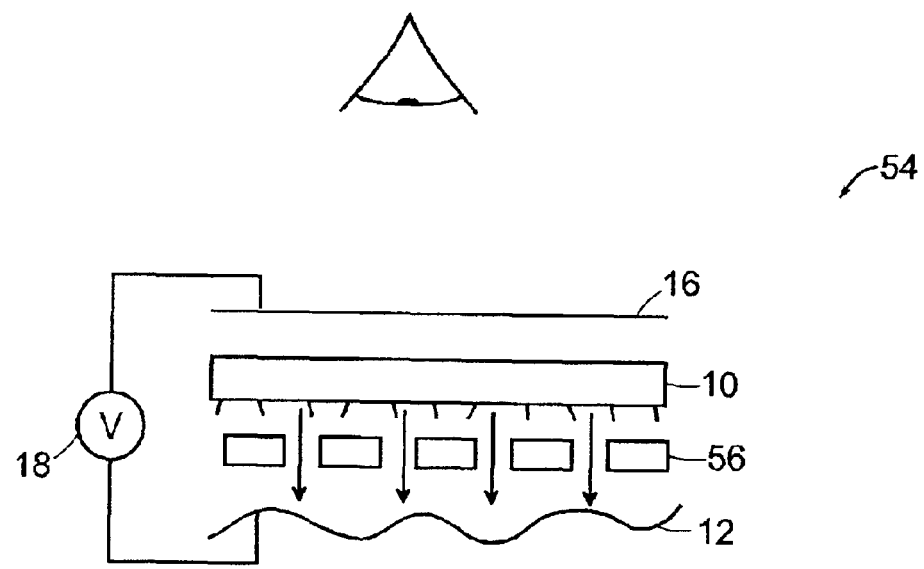
FIG. 7 shows another embodiment of a display in accordance with the present invention, the display containing a photoconductive layer, an organic light-emitting layer, and a fenestrated dielectrophoretic layer.

In another embodiment, as shown in FIG. 7, a display 54 includes light-emitting layer 10, fenestrated dielectrophoretic layer 56, photoconductive layer 12, clear top electrode 16, and a source of voltage 18. The display 54 is multiplexed, with select and non-select voltages being applied to the rows and the data being applied to the columns. The voltage in non-selected rows is chosen such that, with the dark impedance of the photoconductive layer 12, the voltage drop across the light-emitting layer 10 is insufficient to address the light-emitting layer 10 independent of the data on that column. When a pixel is turned on by being in a selected row at the appropriate data voltage, the light-emitting layer 10 emits light. The light travels through the fenestrated dielectrophoretic layer 56 and strikes the photoconductive layer 12, thereby reducing the impedance of the photoconductive layer 12. In an alternative embodiment, the addition of an optical filter or a light-modulating layer, such as a photochromic material, affects the amount of light striking the photoconductive layer. The reduction in impedance causes the voltage drop across the photoconductive layer 12 to decrease, which in turn causes the non-select voltage (which is then applied to that row as other rows are addressed) to drop across the light-emitting layer 10. This non-select voltage drop is sufficient to "latch" the pixel on. A threshold voltage is, therefore, initially required to address the display 54. After light from the light-emitting layer 10 operates to lower the impedance of the photoconductive layer 12, a lower threshold voltage is required to maintain the display 54 in the illuminated state.

Figure 8:
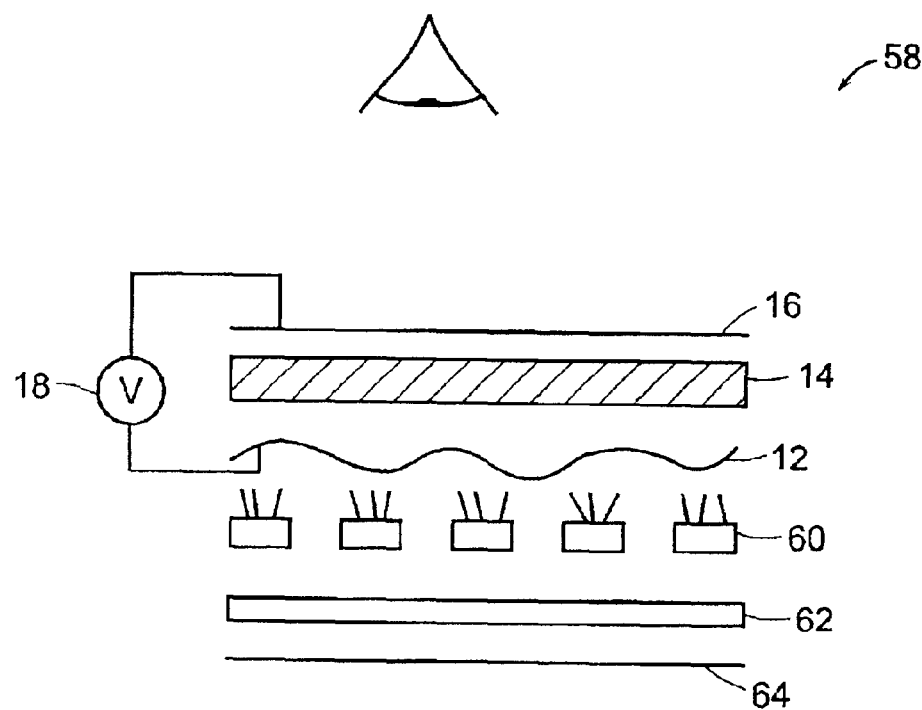
FIG. 8 shows another embodiment of a display in accordance with the present invention, the display containing a light-directing layer and a spacer layer so as to generate an image based on an external reflective surface.

FIG. 8 shows an embodiment of the invention in which an external paper document is used to generate an image. The display 58 of this embodiment includes paper document 64, light diffusor 62, fenestrated light-emitting layer 60, photoconductive layer 12, electrophoretic layer 14, clear top electrode 16, and a source of voltage 18. Light diffusor 62 is optional to the display 58 and may also be embodied as a clear spacer. Paper document 64 is any external object having a reflective surface containing both areas of light appearance and areas of dark appearance. In the embodiment of FIG. 8, the fenestrated light-emitting layer 60 bounces light through the light diffusor 62, which may, for example, focus, diffuse or change the angle of incidence of the light, and to the document 64. The light is then reflected more from lighter areas than from the darker areas of the document 64. The reflected light from the lighter areas of document 64 thereby activates those regions of photoconductive layer 12 that correspond to the reflected regions of the document 64. In this manner, a display that can be placed against any document, or reflective surface, and images itself with high resolution in the same form as the document, is constructed.

Figure 9A:
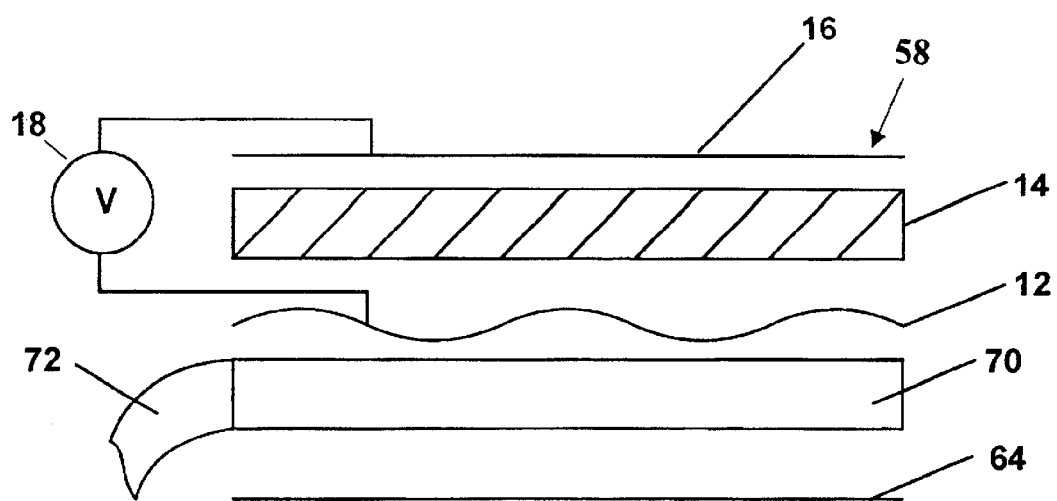
FIG. 9A shows another embodiment of a display in accordance with the present invention, the display containing a light pipe.

In another embodiment if the invention shown in FIG. 9A the display 58 includes paper document 64, light pipe 70, photoconductive layer 12, electrophoretic layer 14, clear top electrode 16, and a source of voltage 18. The light pipe 70 provides a transmissive element and light passes through light pipe 70 to address the photoconductive layer 12 of display 58. The light pipe 70 may be fed from one end by, for example, fiber optic bundle 72. Most of the light that enters light pipe 70 passes straight through the light pipe 70 to address the photoconductive layer 12. The light pipe 70 may address the whole area of photoconductive layer 12 of display 58.

Figure 9B:
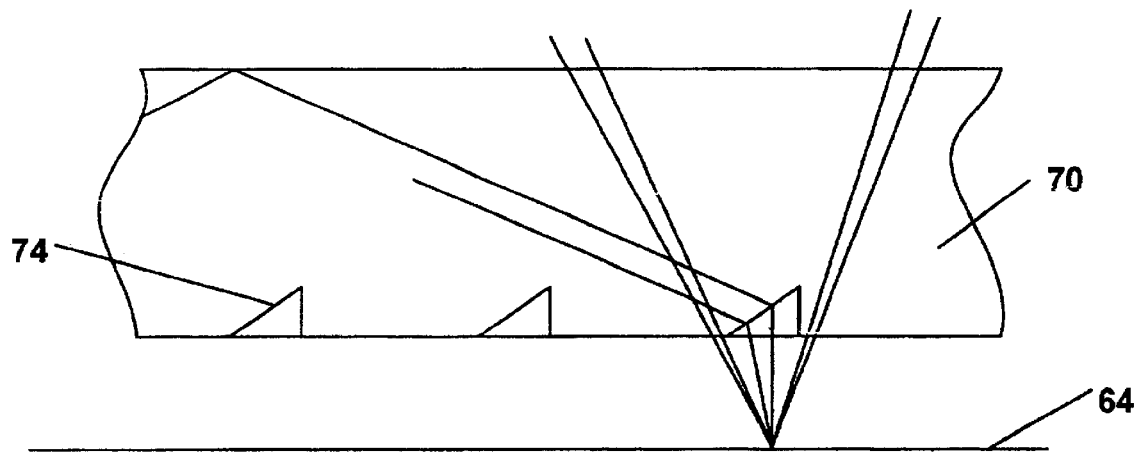
FIG. 9B shows another embodiment of the display shown in FIG. 9A.

In yet another embodiment as shown in FIG. 9B the light pipe 70 comprises microstructures 74. The microstructures 74 may be within the light pipe 70. The microstructures 74 may be on the side of the light pipe 70 closest to the paper document 64. Where microstructures 74 are present on the surface of the light pipe 70, light entering the light pipe 70 may be deflected. For example, where microstructures 74 are present on the surface of the light pipe 70 adjacent the paper document 64, light entering the pipe 70 may be deflected sideways onto the paper document 64.

The effect is further enhanced when the electrophoretic display is bistable and when the entire display is flexible. Thus, this invention provides for a paper-like display that can copy an image directly from a document. In a preferred embodiment, the light-emitting layer does not require an addressing matrix, because information content is translated wholly from the external reflective surface.

Displays of the invention are also preferably flexible. The display materials may, for example, be printed onto thin, flexible substrates. Such substrates may include pliable plastics, polymeric films, metal foils, and thin glass, for example.

Displays of the invention may comprise a smart card. In one embodiment, the smart card comprises a substrate including an activation device and an electrophoretic display disposed on a surface of the substrate. The information storage device can be a smart card interface, an electrophoretic layer interface, or a single interface that includes both. The activation device provides information to or helps to trigger the encapsulated electrophoretic display to display a message. The activation device can be an information storage device, and the display can show information stored in the information storage device. The information storage device can have information associated with a subway access card, or financial information for a telephone card, a debit card, a credit card, or the like. For example, the activation device can be a magnetic strip, a magnet, an electrical or mechanical contact, an internal or external integrated circuit, or an RF coil. The information storage device can be an integrated circuit, which can include a controller and/or RAM chip.

In one embodiment, the activation device is disposed on a rear surface of the substrate and the electrophoretic display is disposed on a front surface of the substrate. In one embodiment, the encapsulated electrophoretic display comprises an electrode, an electrophoretic display medium disposed adjacent the electrode, and a dielectric layer disposed adjacent the display medium. In one embodiment, a portion of the electrode is exposed for making electrical contact. In another embodiment, the electrophoretic display comprises a first electrode, an electrophoretic display medium disposed adjacent the first electrode, and a second clear electrode disposed adjacent the display medium. In one embodiment, the encapsulated electrophoretic display comprises a microencapsulated electrophoretic display medium. In another embodiment, the electrophoretic display comprises a plurality of polymer dispersed electrophoretic display particles. In one embodiment, the encapsulated electrophoretic display is printed on the substrate. In another embodiment, the electrophoretic display is laminated on the substrate.

Figure 10:
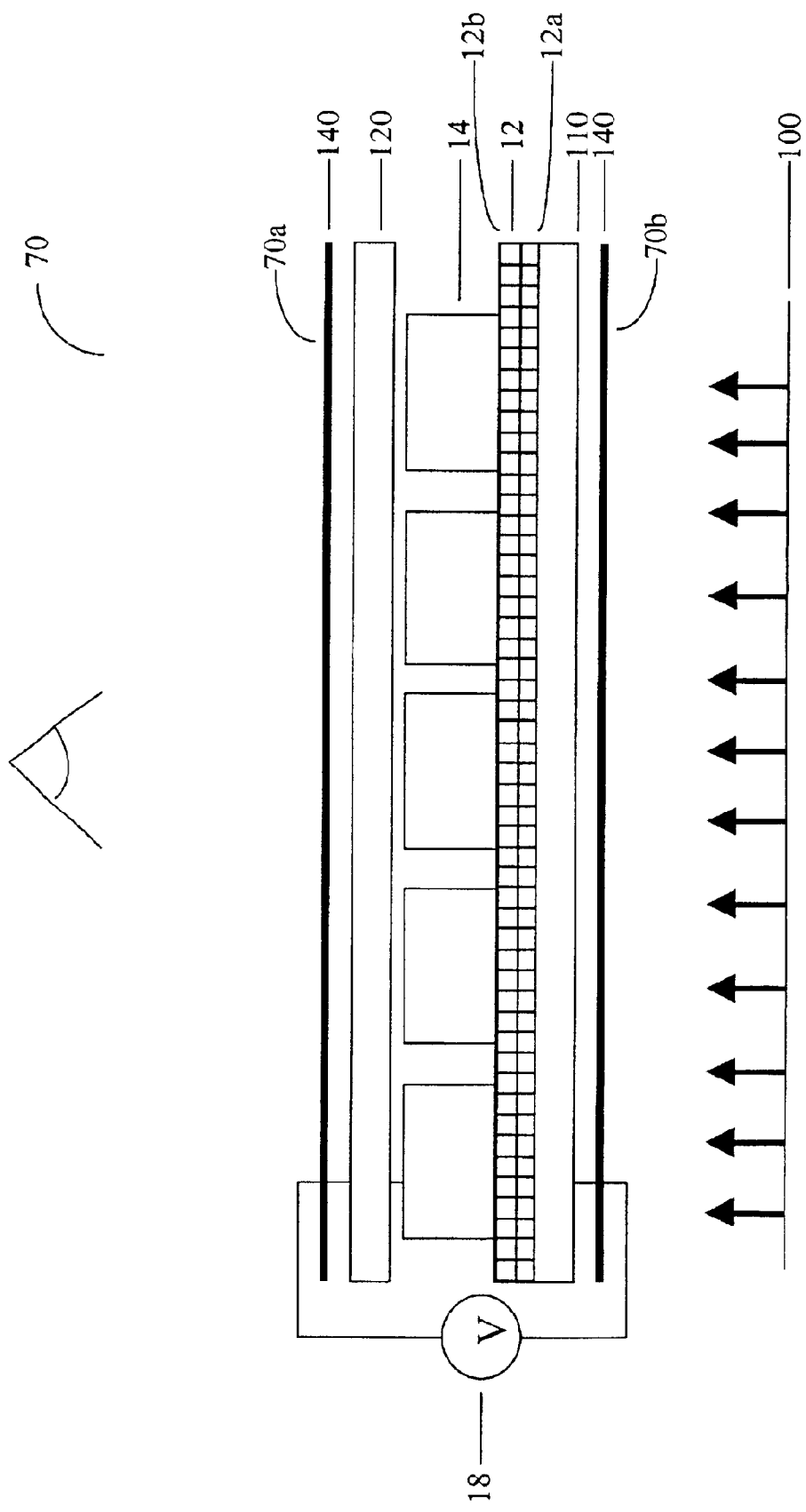
FIG. 10 shows an embodiment of a card in accordance with the invention, the card containing an electrophoretic layer, a photoconductive layer, and two electrodes.

FIG. 10 shows the cross section of an embodiment of the invention where the display is a card 70 which includes a photoconductive layer 12 and an electrophoretic layer 14, where the photoconductive layer 12 is adjacent the electrophoretic layer 14, preferably encapsulated. The photoconductive layer 12 provides impedance as discussed above in connection with, for example, FIG. 7. Exposing the photoconductive layer 12 to light reduces the impedance of the photoconductive layer 12, permitting an applied electric field to address the electrophoretic layer 14.

The card 70 has a front side 70a and a rear side 70b. The photoconductive layer 12 has a first side 12a and a second side 12b. In some embodiments, a first electrode 110 is provided. In other embodiments, both a first electrode 110 and a second electrode 120 are provided. In one embodiment, the first electrode 110 is disposed adjacent the first side 12a of the photoconductive layer 12. In another embodiment, the first electrode 110 is adjacent the first side 12a and the second electrode 120 is adjacent the electrophoretic layer 14 where an electric field, for example a voltage, can be applied to the electrophoretic layer 14 through the first and second electrodes 110 and 120. In some embodiments, at least one of the electrodes is clear. Such clear electrodes may be made of ITO or a glass, plastic, or polyester substrate coated with ITO. Transparent organic conductors, for example poly(3,4-ethylenedioxythiophene) (PEDOT) may be substituted for ITO. In one embodiment, the first electrode 110 adjacent the first side 12a closest to the rear side 70b is clear.

One or more transparent layers 140 may be disposed on the card 70. One or both of the outermost layers of the front side 70a and the rear side 70b of the card 70 may be a transparent layer 140. In one embodiment, the transparent layer 140 is adjacent the first electrode 110 and the second electrode 120, providing the outermost layers of the front side 70a and the rear side 70b of card 70. In some embodiments, the transparent layer 140 is made of plastic, for example, a polyester substrate. In some embodiments, the photoconductive layer 12 may be visible from the rear side 70b of the card 70, through the transparent layer 140 and a clear first electrode 110.

Exposing the rear portion 70b of card 70 to light 100 decreases the impedance of the photoconductive layer 12. In one embodiment, where the rear side 70b of card 70 comprises a clear electrode 110, light 100 from the rear portion strikes the photoconductive layer 12, reducing the impedance. With the impedance lowered, the first electrode 110 and the second electrode 120 are permitted to apply an electric field (i.e., a voltage 18) to the electrophoretic layer 14. Applying voltage 18 to the electrophoretic layer 14 addresses the electrophoretic layer 14, thereby updating the image displayed on the front portion 70a of card 70.

In one embodiment, the rear portion 70b of card 70 is exposed to a pattern of light 100, which lowers the impedance of the photoconductive layer 12 according to the pattern. The lowered impedance permits the first electrode 110 and the second electrode 120 to apply voltage 18, addressing the electrophoretic layer 14 to display the pattern of light 100 on the card 70.

The photoconductive layer 12 may be made from a variety of materials. The material may be, for example, an organic photoconductive polymer, dye-aggregate photoreceptors, and/or pigment-based photoconductors. In one embodiment, the photoconductive layer is made of 2,4,7-trinitro-9-fluorene complexed with poly(N-vinylcarbazole).

Figure 10A:
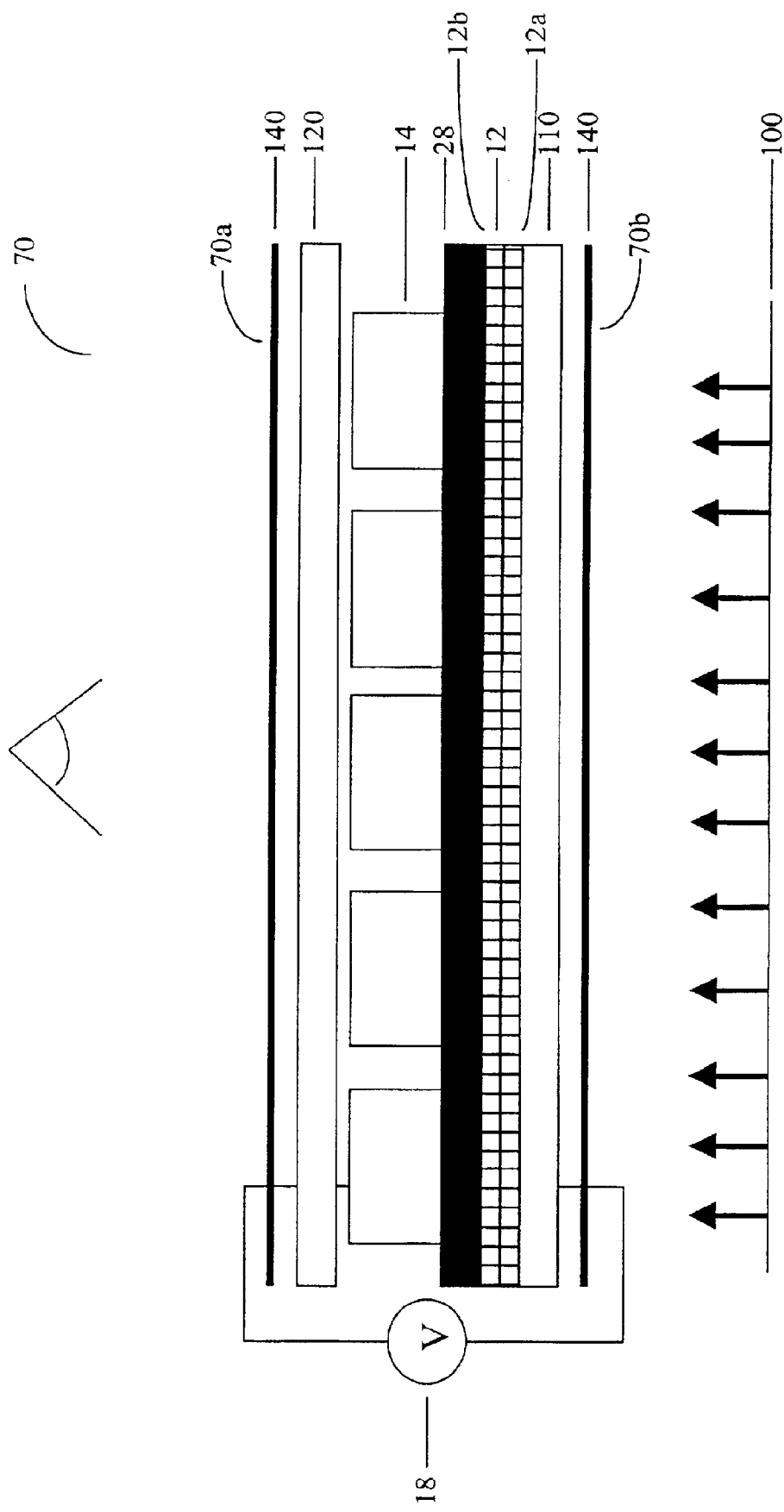
FIG. 10A shows an embodiment of a card in accordance with the invention, the card containing an optical barrier layer.

In one embodiment, as shown in FIG. 10A, a display in the form of a card 70 includes an optical barrier layer 28. The optical barrier layer 28 may be employed to stop "dark currents" that occur in the photoconductive layer 12 due to leakage of light from the front surface of the card 70 through the electrophoretic layer 14. As used herein "dark current" refers to unwanted currents, which flow when the photoconductor is supposed to be non-conducting. In one embodiment, the optical barrier layer 28 is disposed between the second side 12b of the photoconductive layer 12 and the electrophoretic layer 14. The optical barrier layer 28 prevents any exposure of light present at the front 70a of the card 70 from reaching the photoconductive layer 12 thereby lowering its impedance. Thus, the optical barrier layer 28 prevents light emitted on the front 70a of card 70 from addressing the electrophoretic layer 14.

Figure 11:
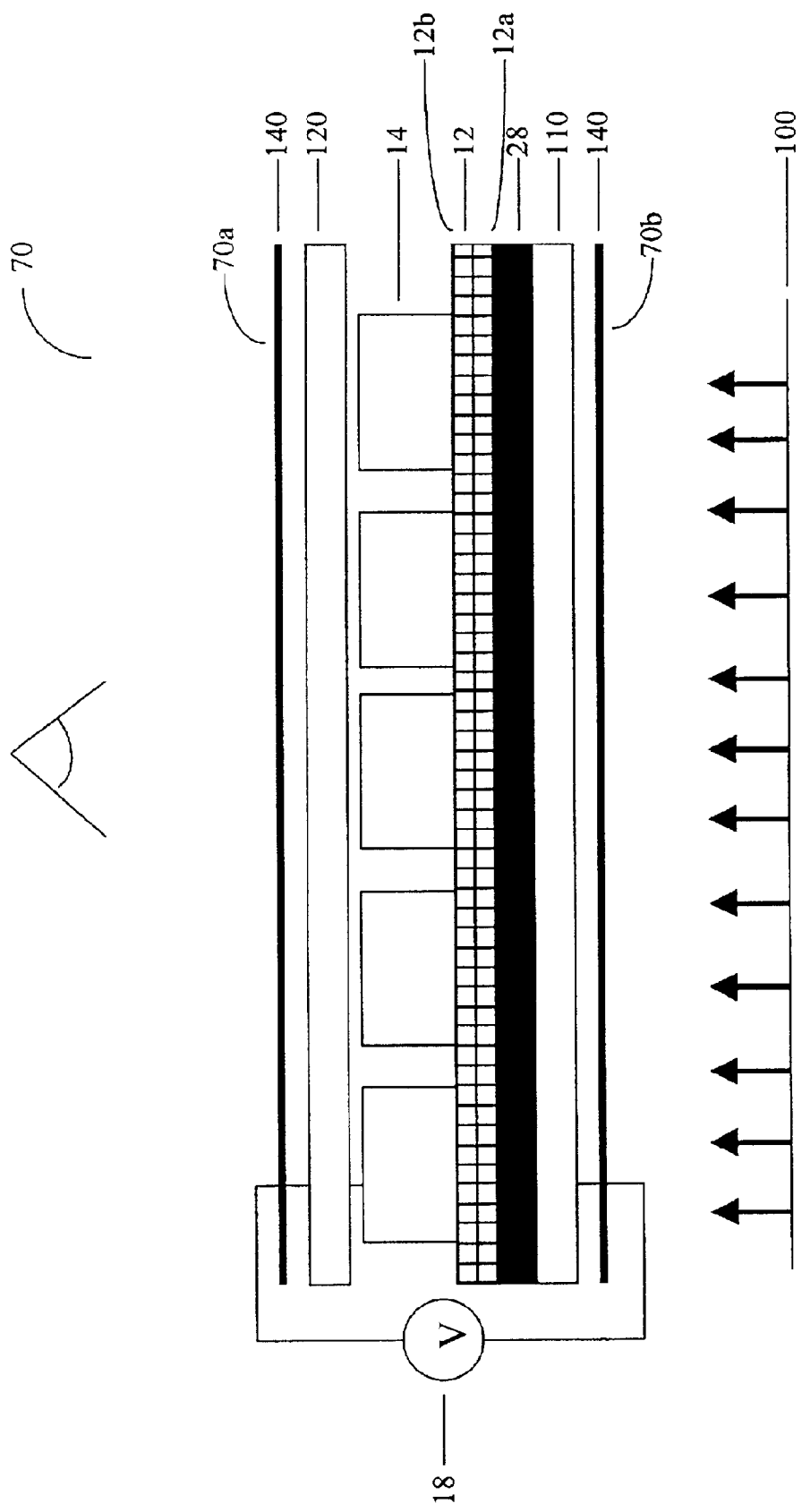
FIG. 11 shows another embodiment of a card in accordance with the invention, the card containing an optical barrier layer.

In an alternative embodiment, as shown in FIG. 11, a display in the form of a card 70 includes a optical barrier layer 28 disposed between the first electrode 110 and the first side 12a of the photoconductive layer 12. The optical barrier layer 28 may be employed to selectively mask the first side 12a such that when the first side 12a is exposed to light 100, the impedance of the photoconductive layer 12 is not reduced where the optical barrier layer 28 is disposed. When the rear side 70b of card 70 is exposed to light 100, the photoconductive layer 12 maintains its impedance at the points where the optical barrier layer 28 is present. Upon exposure to light 100, the impedance of the photoconductive layer 12 will decrease in the exposed portions of the photoconductive layer 12b, i.e., where the optical barrier layer 28 is absent. Thus, the voltage 18 generated by the first electrode 110 and second electrode 120 is unable to address the electrophoretic layer 14 where the optical barrier layer 28 is present. The optical barrier layer 28 may be disposed to provide a desired image when the card 70 is exposed to a flood of light 100, e.g., the optical barrier layer 28 absence spells out a word, for example, the word "valid."

Figure 11A:
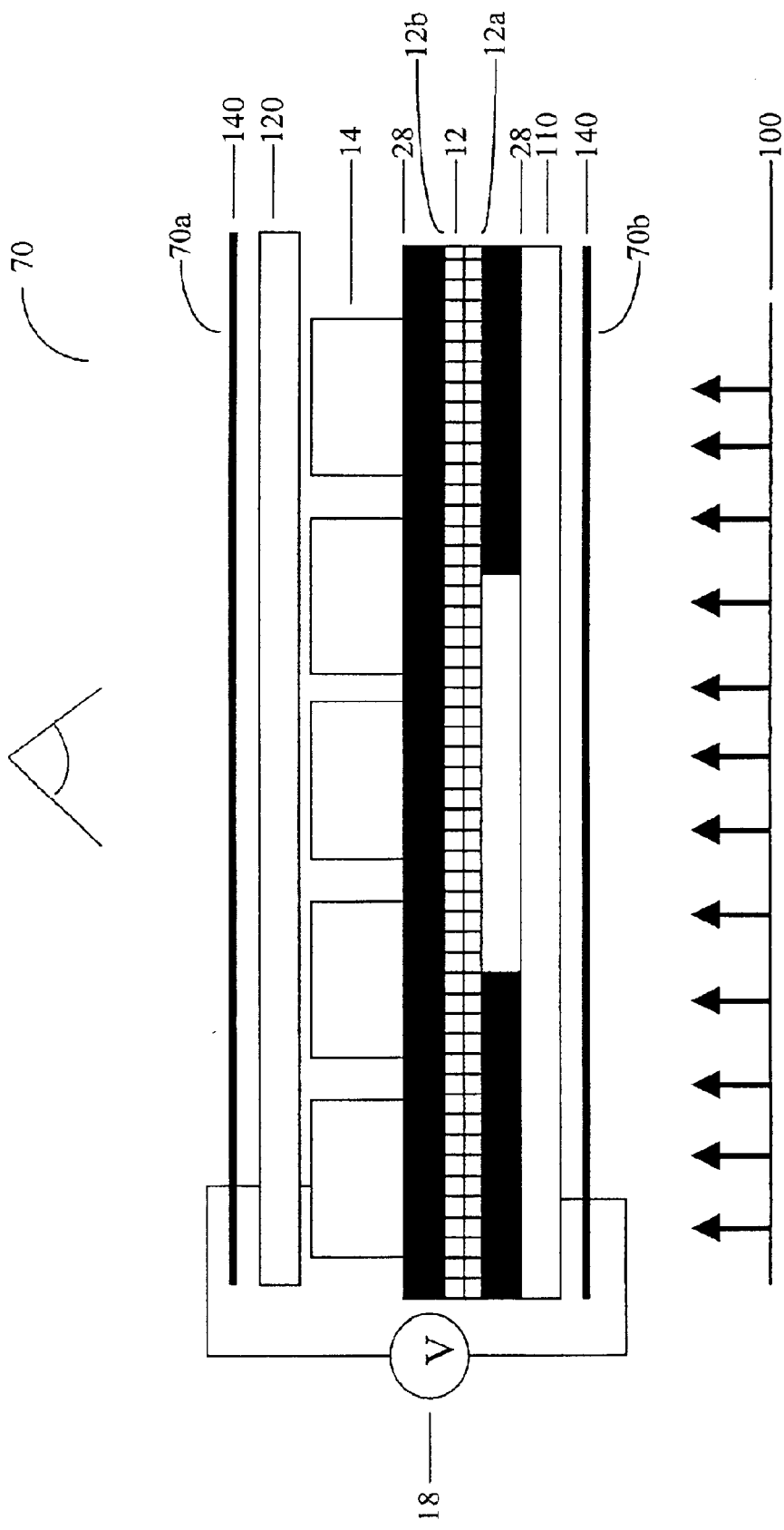
FIG. 11A shows another embodiment of a card in accordance with the invention, the card containing multiple optical barrier layers.

In another embodiment, as shown in FIG. 11A, a display in the form of a card 70 includes multiple optical barrier layers 28. The card 70 includes a first optical barrier layer 28 disposed between the second side 12b and an electrophoretic layer 14 and a second optical barrier layer 28 disposed between the first electrode 110 and the first side 12a. According to this embodiment, the first optical barrier layer 28 prevents any exposure of light present at the front 70a of the card 70 from reaching or lowering the photoconductive layer 12 impedance. Thus, the first optical barrier layer 28 prevents light emitted on the front 70a of card 70 from addressing the electrophoretic layer 14. The second optical barrier layer 28 may be employed to selectively mask the first side 12a as is described above in connection with FIG. 10A, so that the photoconductive layer 12 maintains its impedance at the points where the optical barrier layer 28 is present. By employing the first optical barrier layer 28, the card 70 may display a desired image that cannot be distorted by light exposure from the front side 70a of the card 70. The desired image may be determined by the selective disposal of the second optical barrier layer 28. In yet another embodiment, the optical barrier layer 28 is disposed over all regions of the photoconductive layer 12 except for the selected regions that remain unmasked. The impedance of the unmasked regions of the first side 12a will lower upon exposure to light from a light source.

Figure 12B:
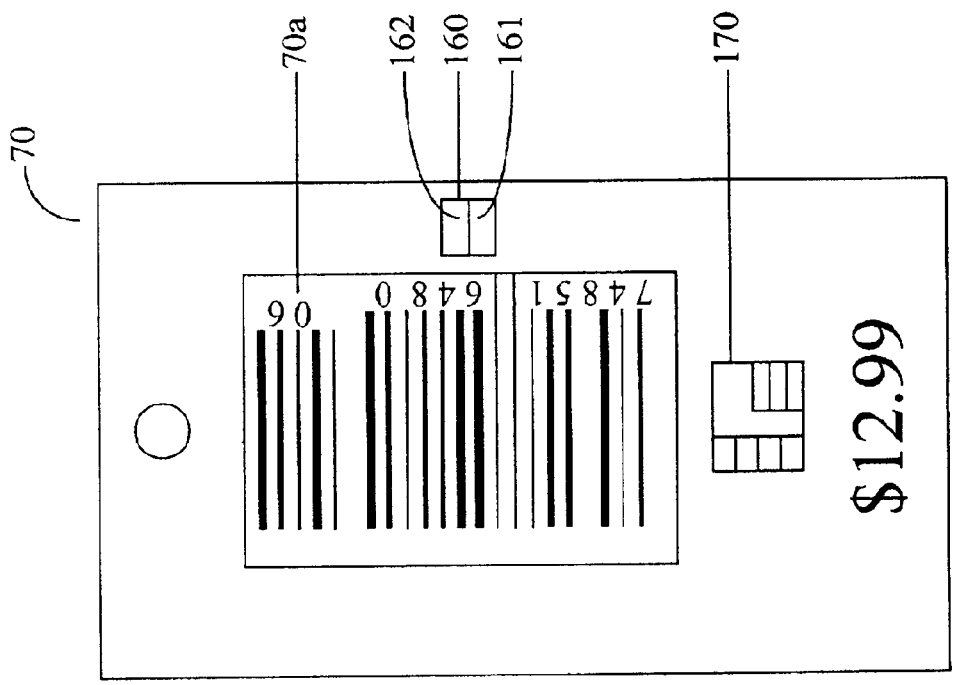
FIG. 12B shows an embodiment of a smart card in accordance with the invention, the smart card displaying a bar code.
Figure 12A:
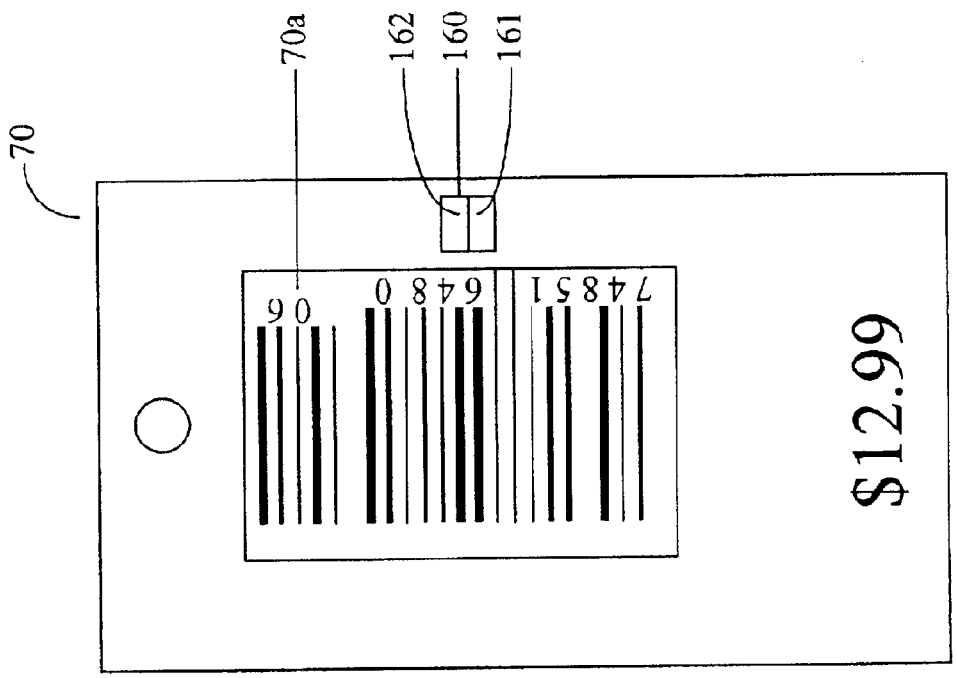
FIG. 12A shows an embodiment of a card in accordance with the invention, the card displaying a bar code.

In another embodiment, as shown in FIGS. 12A and 12B, the front 70a of the card 70 displays an image of a bar code, which may be a one-dimensional bar code or a two-dimensional bar code. In 12A the card has an electrophoretic layer interface 160. In one embodiment, the electrophoretic interface 160 has two pads. The first pad 161 is connected to the first electrode 110 and the second pad 162 is connected to the second electrode. When the electrophoretic layer interface 160 is placed in a reader, the reader contacts the first pad 161 and the second pad 162 through an electrophoretic connector (not shown) and produces a voltage difference between the electrically connected first and second electrodes 110 and 120 of the card 70. The voltage provided to the electrodes 110 and 120 addresses the electrophoretic layer 14 of the card. FIG. 12B shows the described card with an additional interface, a smart card interface 170. The smart card interface 170 is updated and read when the smart card is placed in a smart card ready reader. In some embodiments, the smart card interface 170 is also capable of electrically addressing the electrophoretic layer 14 such that the smart card interface 170 and the electrophoretic layer interface 160 are a single interface.

Figure 13A:
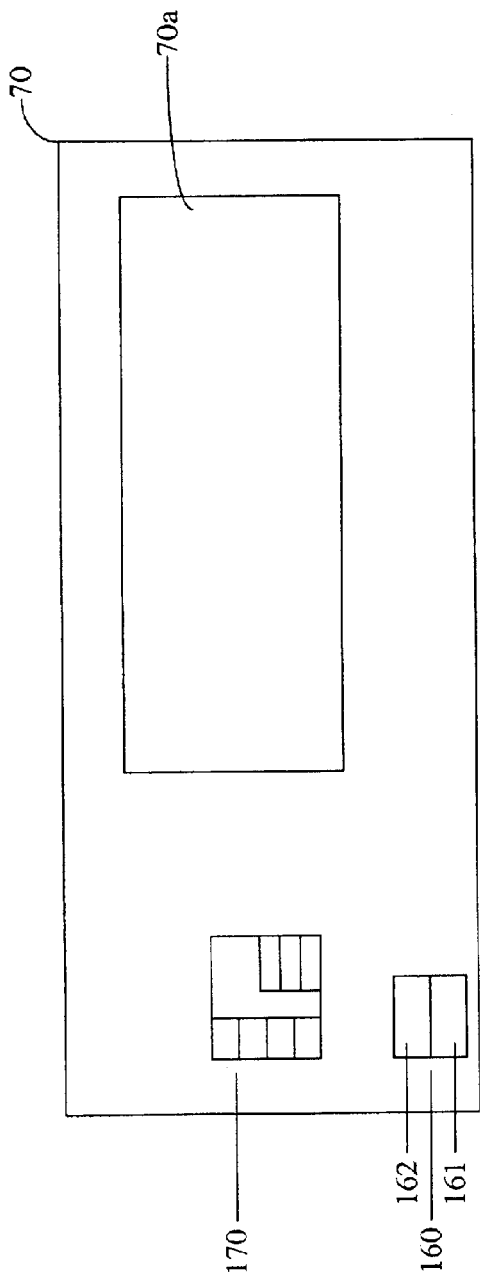
FIG. 13A shows an embodiment of a front side of a smart card in accordance with the invention.
Figure 13B:
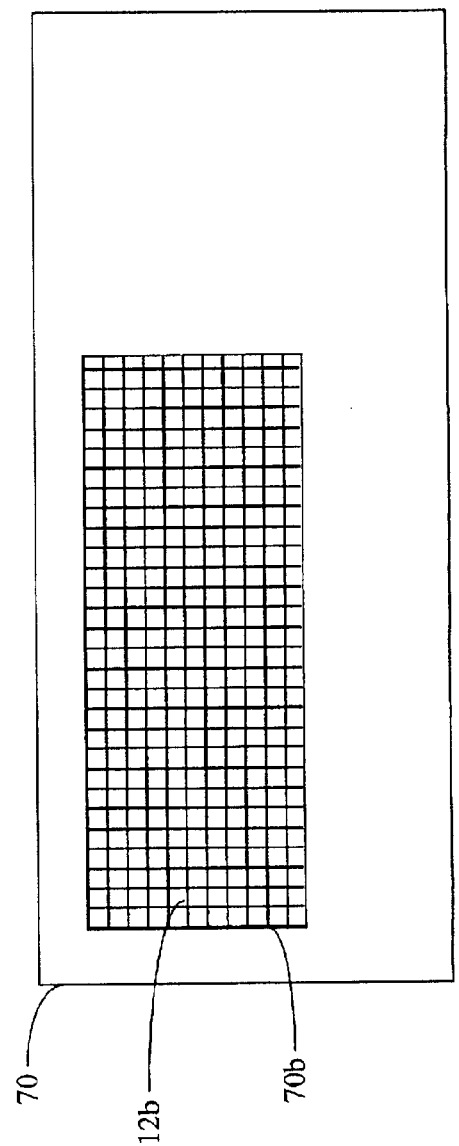
FIG. 13B shows an embodiment of a rear side of a smart card in accordance with the invention.

FIG. 13A shows the front side and FIG. 13B shows the rear side of a display of the invention in the form of a smart card. The front side 70a of the smart card 70 features an electrophoretic layer interface 160, and a smart card interface 170. The photoconductive layer 12 second side 12b is visible through the rear side 70b of the smart card 70. The display of the invention in the form of a card 70, for example, the smart card of FIGS. 12B, 13A, and 13B may be updated by employing a light system, for example, a light system comprising a source of light 100.

The card 70 may further include an activation device for addressing the card. The activation device may comprise either or both of the smart card interface and the electrophoretic layer interface. The activation device may comprise an activation device reader, an activation device writer, and a display addressing head. In one embodiment, the display addressing head comprises an electrostatic head. In one embodiment, the electrostatic head is capable of applying a first electric field to an encapsulated electrophoretic display of the smart card to erase a message on the display, and a second electric field to the electrophoretic display to create a message on the display. In another embodiment, the writer is capable of adding data into an activation device of a smart card. In another embodiment, the reader is an information storage device reader and the writer is an information storage device writer. In one embodiment, the reader is a magnetic strip reader and the writer is a magnetic strip writer.

Figure 14A:
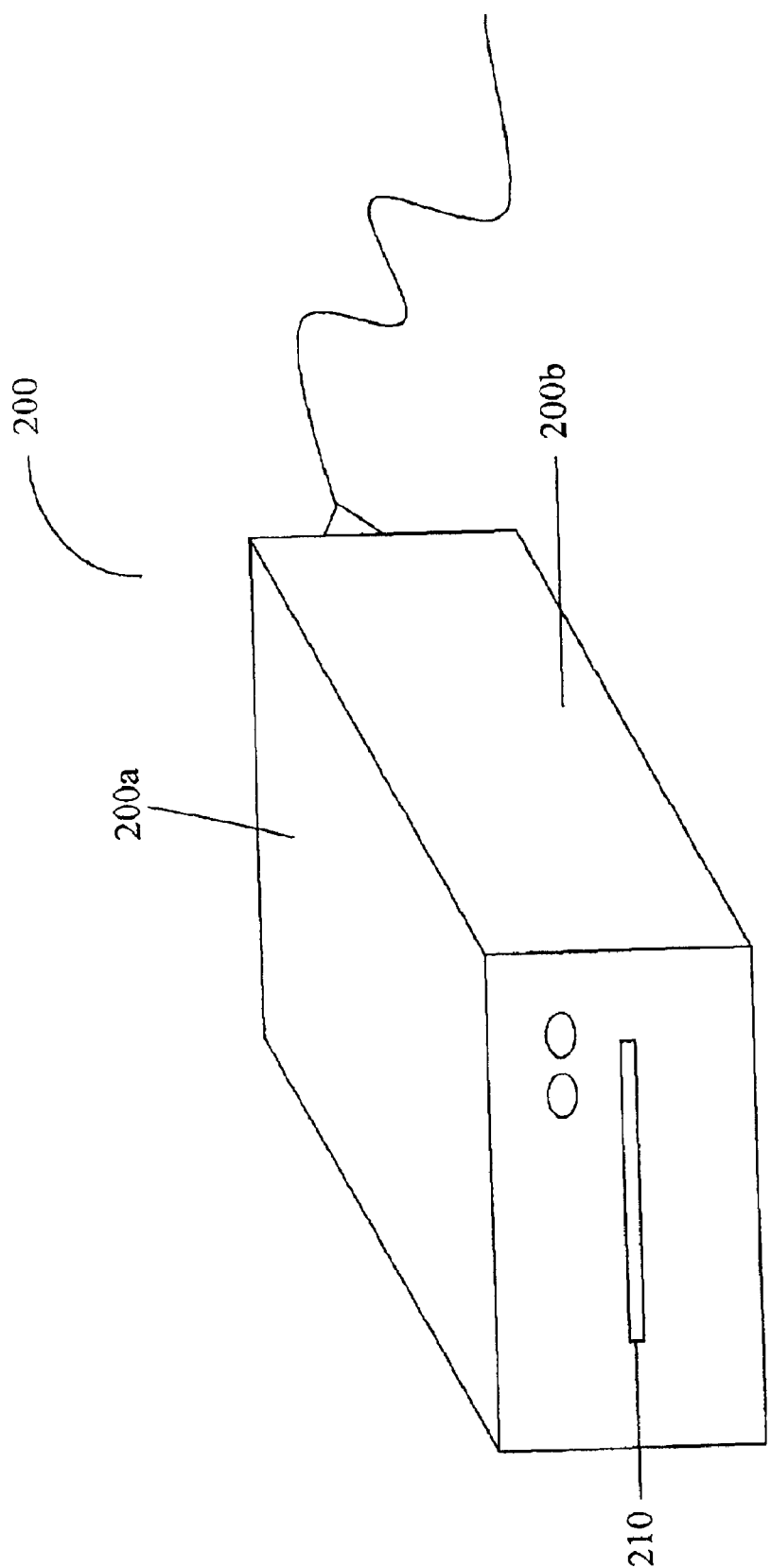
FIG. 14A shows an embodiment of a light system in accordance with the invention.
Figure 14B:
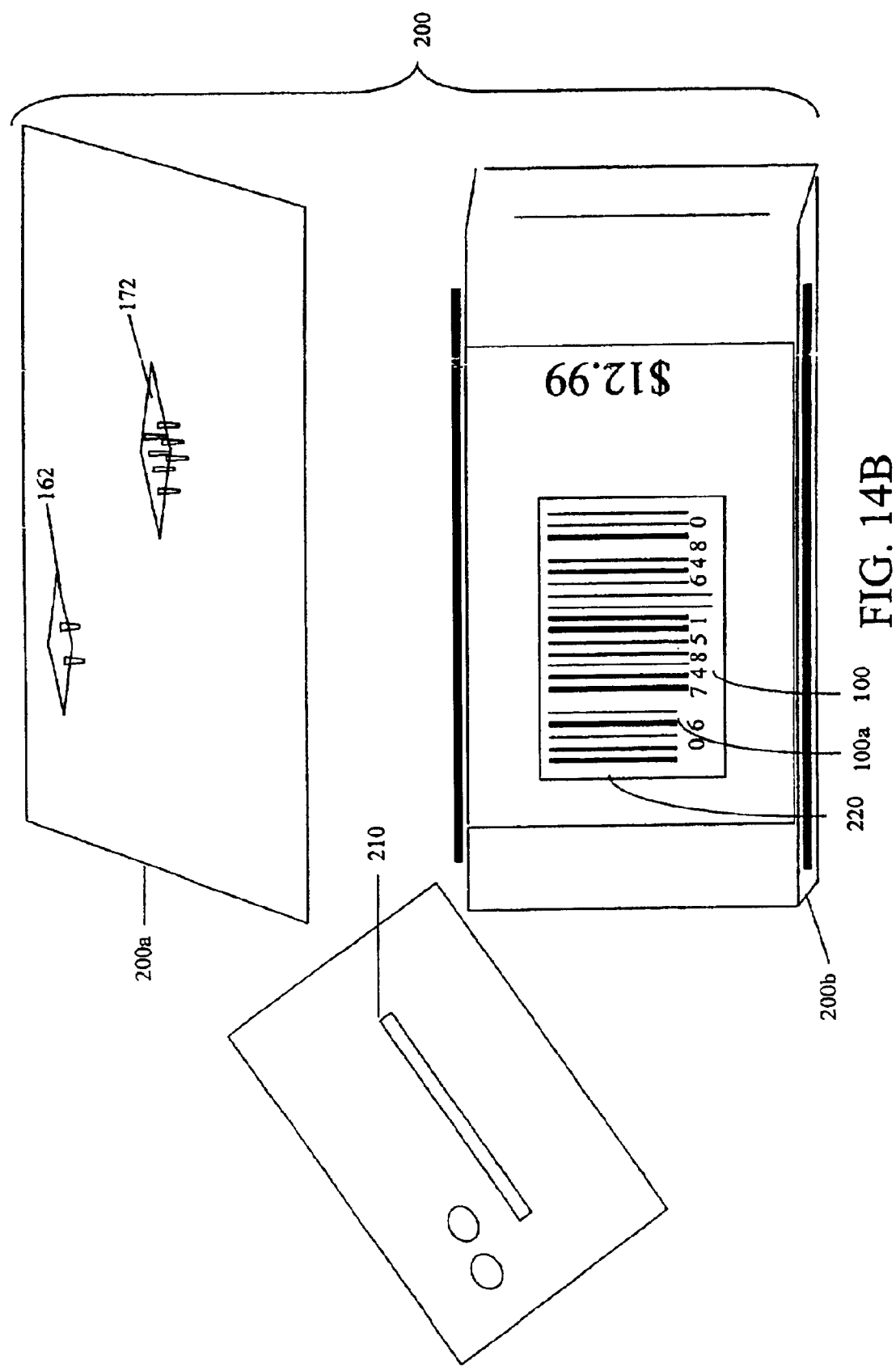
FIG. 14B shows an embodiment of an exploded view of a light system of the invention.

FIG. 14A shows a light system 200. FIG. 14b shows an exploded view of the light system 200 in which the top portion 200a has an electrophoretic connector 162 and a smart card connector 172. The light system 200's bottom portion 200b provides light 100. Portion 200b may comprise an emission layer 220. The light 100 may be in the form of a flood of light. In some embodiments, the light 100 may be in the form of a desired image, for example the light image of a bar code 100a. Examples of emission layer 220 include LED/OLED, CRT, backlit active or passive matrix LCD. The light system 200 layer 220 may be capable of displaying, for example, gray scale images.

The light system 200 may be, for example, a light source. In some embodiments, the light source is an emissive display. In some embodiments the light system 200 is a reader that is electrophoretic layer 14 aware (i.e., aware of, for example, the electrophoretic layer interface 160) and able to update a display image 70a on a card 70. In other embodiments, the light system 200 is able to sense if a card 70 contains an electrophoretic layer 14 and will attempt to update the display only where an electrophoretic layer 14 is present.

The invention also provides a method of updating a card, the method comprising providing a card 70 comprising an electrophoretic layer 14 and a photoconductive layer 12. The photoconductive layer 12 provides impedance and is adjacent the electrophoretic layer 14. Exposing the photoconductive layer 12 to a pattern of light 100 lowers the impedance of the photoconductive layer 12. An electric field is applied to the electrophoretic layer 14, addressing the electrophoretic layer 14. The image of the card 70 changes in response to the applied electric field and the lowered impedance of the photoconductive layer 12.

In one embodiment, the card 70 of the method may be a smartcard 70, such as those described by ISO standard 7816. The method may further comprise the steps of obtaining an output from an activation device of a smart card 70; and addressing an encapsulated electrophoretic display of the smart card 70 to display information responsive to the output from the activation device. In one embodiment, obtaining an output comprises reading an output from the activation device. In one embodiment, obtaining an output comprises reading an output from an information storage device. In another embodiment, obtaining an output comprises reading an output from a smart card interface 170. For example, a smart card connector 172 may read the smart card interface output. In yet another embodiment, the method further comprises the step of writing data into the activation device. In still another embodiment, addressing the encapsulated electrophoretic display comprises addressing the encapsulated electrophoretic display to display financial information. In still another embodiment, addressing the encapsulated electrophoretic display comprises addressing the encapsulated electrophoretic display with an electrostatic head. The electrophoretic layer 14 of the display may be addressed via the electrophoretic interface 160

The light system 200 may be compatible with existing smart cards and able to process information within the smart card interface 170. Where a combined electrophoretic interface 160 and smart card interface 170 are present, the light system 200 may have a single connector that is able to update a display image and process information.

In one embodiment, the light system 200 provides light 100 in an image 100a. The smart card 70, shown and described in relation to FIG. 12B, is inserted into the light system 200 through drive 210. The rear 70b of smart card 70 is placed adjacent the light 100 emitted from the bottom 200b of the light system 200. The electrophoretic connector 162 and the smart card connector 172 present on the light system 200 top portion 200a respectively contact the electrophoretic interface 160 and the smart card interface 170 on the smart card 70. The electrophoretic connector 162 provides voltage to the first electrode 110 through the first pad 161 and to the second electrode 120 through the second pad 162. The electrophoretic connector 162 provides a voltage difference between the first electrode 110 and the second electrode 120 of the smart card 70.

In the embodiment shown in FIG. 14b, light 100 is emitted from the light system 200 in the image 100a of a bar code. The light 100 strikes the first side 12a through a clear first electrode 110 decreasing the photoconductive layer 12 impedance. The electrodes apply a voltage 18 that addresses the electrophoretic layer 14 where the impedance of the photoconductive layer 12 is reduced, then the image 100a is displayed on the electrophoretic layer 14. The display on the front 70a of the smart card 70 is updated to show the bar code of image 100a.

The light system 200 may further comprise one or more electrodes (not shown), for example a first electrode 110, a second electrode 120 or both. In one embodiment, where the card 70 comprises a first electrode 110 adjacent to a first side 12a of the photoconductive layer 12 and an electrophoretic layer 14, the top portion 100a of the light system 200 may include the second electrode 120. When the card 70 having a first electrode 110, a photoconductive layer 12, and an electrophoretic layer 14, is placed inside the drive 210, the front portion 70a of the card 70 is adjacent the second electrode 120 that is disposed on the top portion 200a of the light system 200. Thus, when the card 70 is inside the light system 200, the voltage difference between the first electrode 110 and the second electrode 120 that are in contact with the card 70 address the card 70 to display an image.

The smart card 70 is de-energized and removed from the light system 200. The smart card 70 of FIG. 12B bears the updated image 100a of a bar code, which remains present on the card 70 for a length of time. In some embodiments, the card 70 image is bistable. When the display has two states that are stable in this manner, the display is bistable. If more than two states of the display are stable, then the display is multistable. For the purpose of the present invention, the term bistable indicates a display in which any optical state or image remains fixed once the addressing voltage is removed. However, the definition of a bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Thus, for purposes of the present invention, the term bistable also indicates a display with an optical state sufficiently long-lived so as to be effectively bistable for a particular application. Alternatively, it is possible to construct encapsulated electrophoretic displays in which the image decays quickly once the addressing voltage to the display is removed (i.e., the display is not bistable or multistable). Whether or not an electrophoretic display is bistable, and its degree of bistability, can be controlled through appropriate chemical modification of the electrophoretic particles, the suspending fluid, the capsule, and binder materials that comprise the electrophoretic layer 14.

It will be appreciated that numerous changes and modifications can be made in the specific embodiments of the invention described above without departing from the scope of the invention. For example, the light system could have the form of an optical mask with transparent and opaque regions interposed between a flood light source and the card, the mask showing a pattern that is written to the card. Such a system would be especially useful where only a limited range of data need to be written to the card, for example where the digits 0 and 1–9 need to be written on the card. The mask could be a flexible sheet on spindles and that is rolled from one spindle to another to select which data is patterned onto the card. An array of such devices could be disposed next to each other to produce a composite image; for example, four parallel reels, each with the digits 0–9, could project any number from 0000 to 9999.

Alternatively or in addition, in one embodiment, the card reader could contain a device to read a bar code or other information previously printed on the card, then process this bar code or other information to determine a new image to be printed on the card. This image would, in turn, be read later by another card reader. Thus, the display becomes, in addition, an information storage medium and no magnetic strip or embedded memory device is required. In some embodiments where the display is the information storage medium, i.e., the display comprises the smartcard, it is preferable that the display have enough bistability to retain the image between writing and reading.

The invention also provides a method of manufacturing a smart card. In one embodiment, the method comprises the steps of providing a substrate; disposing a magnetic strip on a surface of the substrate; and disposing an encapsulated electrophoretic display on a surface of the substrate. In one embodiment, the encapsulated electrophoretic display is disposed on a surface of the substrate by laminating an assembly of an electrode and an encapsulated electrophoretic display medium on the substrate. In another embodiment, the encapsulated electrophoretic display is disposed on a surface of the substrate by laminating an assembly of an electrode and a plurality of microencapsulated electrophoretic particles. In another embodiment, an encapsulated electrophoretic display is disposed on a surface of the substrate by printing the electrophoretic display.

In another embodiment, the method of manufacturing a smart card comprises the steps of providing an activation device; laminating the activation device inside a substrate; and disposing an encapsulated electrophoretic display on a surface of the substrate. In one embodiment, the encapsulated electrophoretic display is disposed on a surface of the substrate by laminating an assembly of an electrode and an encapsulated electrophoretic display medium on the substrate. In another embodiment, the encapsulated electrophoretic display is disposed on a surface of the substrate by laminating an assembly of an electrode and a plurality of microencapsulated electrophoretic particles. In another embodiment, the encapsulated electrophoretic display is disposed on a surface of the substrate by printing the electrophoretic display. In another embodiment, the method further comprises the steps of providing a first electrode 110, printing an encapsulated electrophoretic display medium on the first electrode, 110 and disposing a second clear electrode 120 on the display medium. In still another embodiment, the method further comprises the steps of providing an electrode, printing an encapsulated electrophoretic display medium on the electrode, and disposing a dielectric layer on the display medium. The invention therefore provides for the combination of light-emitting, photoconductive, and electrophoretic materials in a display system that is addressable using a multiplex addressing drive scheme. Such a combination permits construction of cheap, low-power, bistable, and fast-switching, yet high-resolution, displays. Such displays are uniquely suited for flexible, curved, and contoured handheld applications, as well as for large-areas, such as billboards, due to their all-printed construction. Practical applications of such displays include portable electronics, such as pagers, cellular telephones, notebook computers, personal digital assistants, etc., large area displays for signs, advertising, and informational purposes, wearable displays, displays on appliances, displays on non-portable electronic devices, electronic paper, electronic newspapers, and electronic books. Other portable display devices include cards such as, access cards, smart cards, payment cards, price tags, lottery tickets, and other cards where updated information may be beneficial.

Electrophoretic displays and systems for addressing such displays are therefore described. Additional aspects and advantages of the invention are apparent upon consideration of the foregoing. Accordingly, the scope of the invention is limited only by the scope of the appended claims.

What is claimed is:

1. A system of updating an image on a card, the system comprising:

(a) a light system generating a pattern of light; and (b) a card comprising an electrophoretic layer and a photoconductive layer, the photoconductive layer adjacent the electrophoretic layer;

wherein the pattern of light generated by the light system reduces the impedance of the photoconductive layer, permitting an applied electric field to address the electrophoretic layer where the impedance is reduced.

2. The system of claim 1, wherein the light system comprises a light source.

3. The system of claim 1, wherein the light system comprises an emissive display.

4. The system of claim 1, wherein the photoconductive layer is adjacent a first electrode.

5. The system of claim 1, further comprising a first electrode adjacent a first side of the photoconductive layer and a second electrode adjacent the electrophoretic layer.

6. The system of claim 5, wherein the first electrode is clear.

7. The system of claim 6, wherein the first electrode comprises indium tin oxide.

8. The system of claim 5, wherein the second electrode is clear.

9. The system of claim 8, wherein the second electrode comprises indium tin oxide.

10. The system of claim 1, wherein the card further comprises an optical barrier layer between a second side of the photoconductive layer and the electrophoretic layer.

11. The system of claim 1, wherein the card further comprises an optical barrier layer between a first side of the photoconductive layer and a first electrode.

12. The system of claim 1, wherein the card comprises a smart card.

13. The system of claim 12, wherein the smart card further comprises a smart card interface.

14. The system of claim 13, wherein the smart card interface electrically addresses the electrophoretic layer.

15. The system of claim 1, wherein the card further comprises an electrophoretic interface.

16. The system of claim 1, wherein the pattern of light comprises a flood exposure.

17. The system of claim 1, wherein the pattern of light comprises a bar code.

18. The system of claim 1, wherein the photoconductive layer comprises material selected from the group consisting of organic photoconductive polymers, inorganic photoconductors, dye-aggregate photoreceptors, and pigment-based photoconductors.

19. The system of claim 1, wherein the photoconductive layer comprises 2,4,7-trinitro-9-fluorenone complexed with poly(N-vinylcarbazole).

20. A card comprising:

a photoconductive layer; and an electrophoretic layer, the photoconductive layer adjacent the electrophoretic layer;

wherein the photoconductive layer impedance is reduced when the photoconductive layer is exposed to a pattern of light, permitting an applied electric field to address the electrophoretic layer where the impedance is reduced.

21. The card of claim 20, wherein a first electrode is adjacent a first side of the photoconductive layer and a second electrode is adjacent the electrophoretic layer.

22. The card of claim 21, wherein the first electrode is clear.

23. The card of claim 22, wherein the first electrode comprises indium tin oxide.

24. The card of claim 21, wherein the second electrode is clear.

25. The card of claim 24, wherein the second electrode comprises indium tin oxide.

26. The card of claim 20, wherein the card further comprises an optical barrier layer between a second side of the photoconductive layer and the electrophoretic layer.

27. The card of claim 20, wherein the card further comprises an optical barrier layer between a first side of the photoconductive layer and a first electrode.

28. The card of claim 20, wherein the card comprises a smart card.

29. The card of claim 28, wherein the smart card further comprises a smart card interface.

30. The card of claim 20, wherein the card further comprises an electrophoretic layer interface.

31. The card of claim 30, wherein the electrophoretic layer interface further comprises a smart card interface.

32. The card of claim 30, wherein the electrophoretic layer interface comprises a first pad and a second pad, the first pad being electrically coupled to a first electrode and the second pad being electrically coupled to a second electrode.

33. The card of claim 20, wherein the photoconductive layer comprises material selected from the group consisting of organic photoconductive polymers, inorganic photoconductors, dye-aggregate photoreceptors, and pigment-based photoconductors.

34. The card of claim 20, wherein the photoconductive layer comprises 2,4,7-trinitro-9-fluorenone complexed with poly(N-vinylcarbazole).

35. A method of updating an image on a card, the method comprising the steps of:

(a) providing a card comprising an electrophoretic layer and a photoconductive layer, the photoconductive layer adjacent the electrophoretic layer, the photoconductive layer providing impedance;

(b) lowering the impedance of the photoconductive layer by exposing the photoconductive layer to a pattern of light;

(c) addressing the electrophoretic layer by applying an electric field, the image of the card changing in response to the applied electric field and the lowered impedance of the photoconductive layer.

36. The method of claim 35, wherein the pattern of light comprises a flood exposure.

37. The method of claim 35, wherein the pattern of light comprises a bar code.

38. The method of claim 35, further comprising providing a card with a smart card interface.

39. The method of claim 38, wherein the light system comprises a smart card reader.

40. The method of claim 35, further comprising providing a card with an electrophoretic layer interface.

41. The method of claim 40, wherein the electrophoretic layer interface further comprises a smart card interface.

* * * * *